US012320981B2

(12) United States Patent
Price et al.

(10) Patent No.: US 12,320,981 B2
(45) Date of Patent: *Jun. 3, 2025

(54) SYSTEMS AND METHODS FOR POWER EFFICIENT IMAGE ACQUISITION USING SINGLE PHOTON AVALANCHE DIODES (SPADS)

(71) Applicant: Microsoft Technology Licensing, LLC, Redmond, WA (US)

(72) Inventors: Raymond Kirk Price, Carnation, WA (US); Michael Bleyer, Seattle, WA (US); Christopher Douglas Edmonds, Carnation, WA (US); William Chao-Hui Hwang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/640,218

(22) Filed: Apr. 19, 2024

(65) Prior Publication Data

US 2024/0345400 A1    Oct. 17, 2024

Related U.S. Application Data

(63) Continuation of application No. 17/334,603, filed on May 28, 2021, now Pat. No. 11,988,835.

(51) Int. Cl.
| | | |
|---|---|---|
| *G02B 27/01* | (2006.01) | |
| *H04N 23/65* | (2023.01) | |
| *H04N 25/441* | (2023.01) | |
| *H04N 25/445* | (2023.01) | |

(52) U.S. Cl.
CPC ....... *G02B 27/0172* (2013.01); *H04N 23/651* (2023.01); *H04N 25/441* (2023.01); *H04N 25/445* (2023.01)

(58) Field of Classification Search
CPC .. G02B 27/0172; H04N 23/65; H04N 23/651; H04N 25/44; H04N 25/441; H04N 25/445
See application file for complete search history.

(56) References Cited

U.S. PATENT DOCUMENTS

2017/0347044 A1*  11/2017  Douady-Pleven ... H04N 19/503
2020/0036918 A1*  1/2020   Ingle ................... H04N 25/702

* cited by examiner

*Primary Examiner* — Antoinette T Spinks
(74) *Attorney, Agent, or Firm* — Workman Nydegger

(57) ABSTRACT

A system for power efficient image acquisition is configurable to capture, using an image sensor, a plurality of partial image frames including at least a first partial image frame and a second partial image frame. The first partial image frame is captured at a first timepoint using a first subset of image sensing pixels of the plurality of image sensing pixels of the image sensor. The second partial image frame is captured at a second timepoint using a second subset of image sensing pixels of the plurality of image sensing pixels of the image sensor. The second subset of image sensing pixels includes different image sensing pixels than the first subset of image sensing pixels, and the second timepoint is temporally subsequent to the first timepoint. The system is configurable to generate a composite image frame based on the plurality of partial image frames.

20 Claims, 20 Drawing Sheets

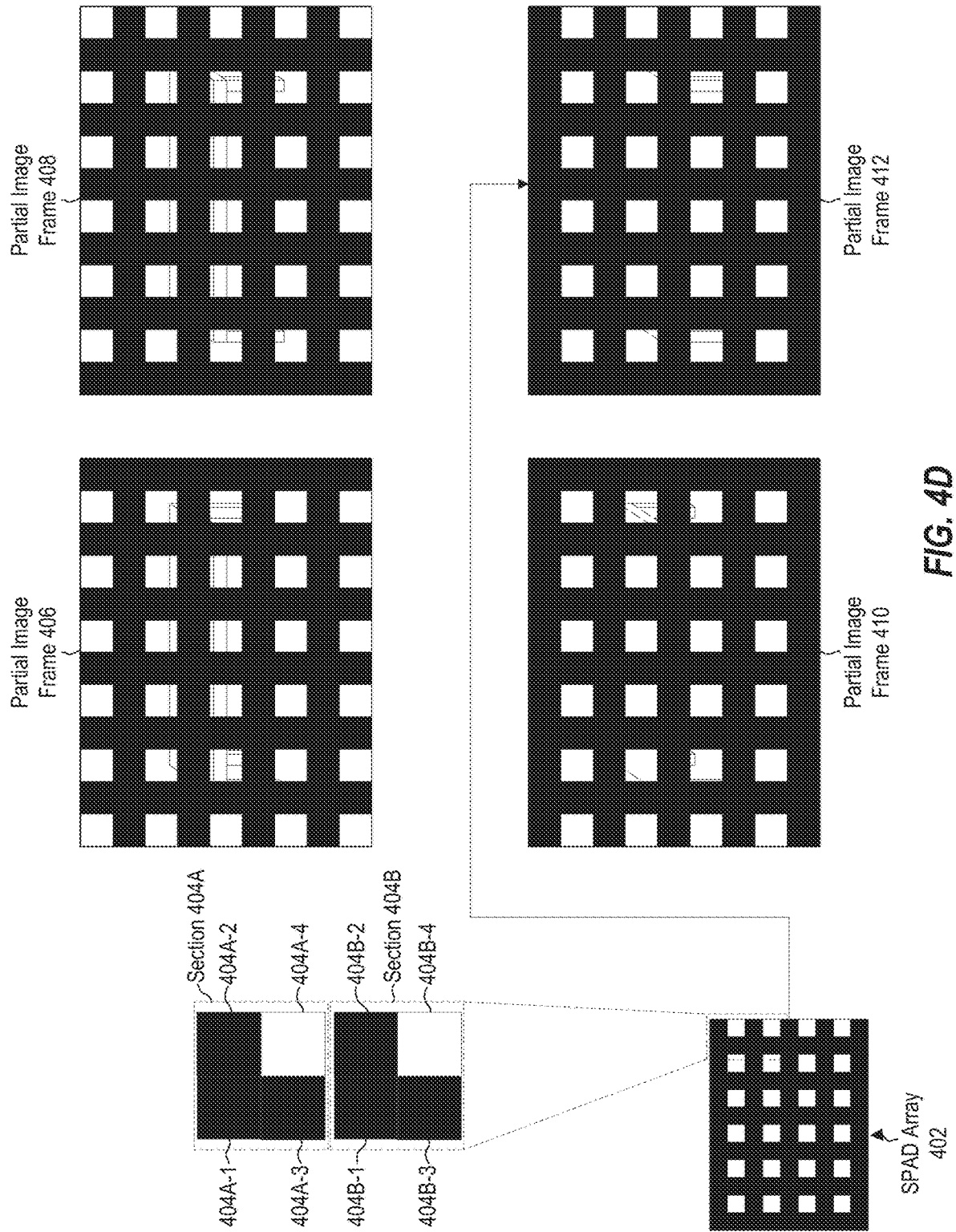

SYSTEMS AND METHODS FOR POWER EFFICIENT IMAGE ACQUISITION USING SINGLE PHOTON AVALANCHE DIODES (SPADS)

CROSS-REFERENCE TO RELATED APPLICATION(S)

This application is a continuation of U.S. patent application Ser. No. 17/334,603, filed on May 28, 2021, and entitled "SYSTEMS AND METHODS FOR POWER EFFICIENT IMAGE ACQUISITION USING SINGLE PHOTON AVALANCHE DIODES (SPADS)", the entirety of which is incorporated herein by reference for all purposes.

BACKGROUND

Mixed-reality (MR) systems, including virtual-reality and augmented-reality systems, have received significant attention because of their ability to create truly unique experiences for their users. For reference, conventional virtual-reality (VR) systems create a completely immersive experience by restricting their users' views to only a virtual environment. This is often achieved, in VR systems, through the use of a head-mounted device (HMD) that completely blocks any view of the real world. As a result, a user is entirely immersed within the virtual environment. In contrast, conventional augmented-reality (AR) systems create an augmented-reality experience by visually presenting virtual objects that are placed in or that interact with the real world.

As used herein, VR and AR systems are described and referenced interchangeably. Unless stated otherwise, the descriptions herein apply equally to all types of mixed-reality systems, which (as detailed above) includes AR systems, VR reality systems, and/or any other similar system capable of displaying virtual objects.

Some MR systems include one or more cameras for facilitating image capture, video capture, and/or other functions. For instance, cameras of an MR system may utilize images and/or depth information obtained using the camera(s) to provide pass-through views of a user's environment to the user. An MR system may provide pass-through views in various ways. For example, an MR system may present raw images captured by the camera(s) of the MR system to a user. In other instances, an MR system may modify and/or reproject captured image data to correspond to the perspective of a user's eye to generate pass-through views. An MR system may modify and/or reproject captured image data to generate a pass-through view using depth information for the captured environment obtained by the MR system (e.g., using a depth system of the MR system, such as a time-of-flight camera, a rangefinder, stereoscopic depth cameras, etc.). In some instances, an MR system utilizes one or more predefined depth values to generate pass-through views (e.g., by performing planar reprojection).

In some instances, pass-through views generated by modifying and/or reprojecting captured image data may at least partially correct for differences in perspective brought about by the physical separation between a user's eyes and the camera(s) of the MR system (known as the "parallax problem," "parallax error," or, simply "parallax"). Such pass-through views/images may be referred to as "parallax-corrected pass-through" views/images. By way of illustration, parallax-corrected pass-through images may appear to a user as though they were captured by cameras that are co-located with the user's eyes.

A pass-through view can aid users in avoiding disorientation and/or safety hazards when transitioning into and/or navigating within a mixed-reality environment. Pass-through views may also enhance user views in low visibility environments. For example, mixed-reality systems configured with long wavelength thermal imaging cameras may facilitate visibility in smoke, haze, fog, and/or dust. Likewise, mixed-reality systems configured with low light imaging cameras facilitate visibility in dark environments where the ambient light level is below the level required for human vision.

To facilitate imaging of an environment for generating a pass-through view, some MR systems include image sensors that utilize complementary metal-oxide-semiconductor (CMOS) and/or charge-coupled device (CCD) technology. For example, such technologies may include image sensing pixel arrays where each pixel is configured to generate electron-hole pairs in response to detected photons. The electrons may become stored in per-pixel capacitors, and the charge stored in the capacitors may be read out to provide image data (e.g., by converting the stored charge to a voltage).

However, such image sensors suffer from a number of shortcomings. For example, the signal to noise ratio for a conventional image sensor may be highly affected by read noise, especially when imaging under low visibility conditions. For instance, under low light imaging conditions (e.g., where ambient light is below about 10 lux, such as within a range of about 1 millilux or below), a CMOS or CCD imaging pixel may detect only a small number of photons, which may cause the read noise to approach or exceed the signal detected by the imaging pixel and decrease the signal-to-noise ratio.

The dominance of read noise in a signal detected by a CMOS or CCD image sensor is often exacerbated when imaging at a high frame rate under low light conditions. Although a lower framerate may be used to allow a CMOS or CCD sensor to detect enough photons to allow the signal to avoid being dominated by read noise, utilizing a low framerate often leads to motion blur in captured images. Motion blur is especially problematic when imaging is performed on an HMD or other device that undergoes regular motion during use.

In addition to affecting pass-through imaging, the read noise and/or motion blur associated with conventional image sensors may also affect other operations performed by HMDs, such as late stage reprojection, rolling shutter corrections, object tracking (e.g., hand tracking), surface reconstruction, semantic labeling, 3D reconstruction of objects, and/or others.

To address shortcomings associated with CMOS and/or CCD image sensors, devices have emerged that utilize single photon avalanche diode (SPAD) image sensors. In contrast with conventional CMOS or CCD sensors, a SPAD is operated at a bias voltage that enables the SPAD to detect a single photon. Upon detecting a single photon, an electron-hole pair is formed, and the electron is accelerated across a high electric field, causing avalanche multiplication (e.g., generating additional electron-hole pairs). Thus, each detected photon may trigger an avalanche event. A SPAD may operate in a gated manner (each gate corresponding to a separate shutter operation), where each gated shutter operation may be configured to result in a binary output. The binary output may comprise a "1" where an avalanche event was detected during an exposure (e.g., where a photon was detected), or a "0" where no avalanche event was detected. Separate shutter operations may be performed consecutively and integrated over a frame capture time period. The binary output of the consecutive shutter operations over a frame capture time period may be counted, and an intensity value may be calculated based on the counted binary output.

An array of SPADs may form an image sensor, with each SPAD forming a separate pixel in the SPAD array. To capture an image of an environment, each SPAD pixel may detect avalanche events and provide binary output for consecutive shutter operations in the manner described herein. The per-pixel binary output of consecutive shutter operations over a frame capture time period may be counted, and per-pixel intensity values may be calculated based on the counted per-pixel binary output. The per-pixel intensity values may be used to form an intensity image of an environment.

SPAD sensors show promise for overcoming various shortcomings associated with CMOS or CCD sensors, particularly for image acquisition under low light conditions. However, implementing SPAD sensors for image and/or video capture is still associated with many challenges. For example, each avalanche event of a SPAD pixel of a SPAD sensor consumes power. Thus, SPAD sensors imaging under low light conditions (where the SPADs detect fewer photons and therefore experiences fewer avalanche events) consume less power than SPAD sensors imaging under illuminated conditions. For instance, a SPAD sensor operating in a low light environment may consume about 150-200 milliwatts of power, whereas a SPAD sensor operating in an illuminated environment may consume about 700-800 milliwatts of power.

Furthermore, SPAD sensors are often affected by dark current. Dark current can induce an avalanche event without photon detection, thereby adding noise to SPAD imagery. The amount of dark current experienced by SPAD sensors increases with temperature. In addition, high-power operation of a SPAD sensor in a lighted environment may contribute to increased operational temperature of the SPAD sensor, thereby increasing dark current and resulting signal noise.

Accordingly, there is an ongoing need and desire for improvements to the image acquisition using SPADs, particularly in illuminated and/or high temperature environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include systems, methods, and devices for power efficient image acquisition.

Some embodiments include a system that has an image sensor comprising a plurality of image sensing pixels, one or more processors, and one or more hardware storage devices storing instructions that are executable by the one or more processors to configure the system to perform various acts. The acts include capturing, using the image sensor, a plurality of partial image frames including at least a first partial image frame and a second partial image frame. The first partial image frame is captured at a first timepoint using a first subset of image sensing pixels of the plurality of image sensing pixels of the image sensor. The second partial image frame is captured at a second timepoint using a second subset of image sensing pixels of the plurality of image sensing pixels of the image sensor. The second subset of image sensing pixels includes different image sensing pixels than the first subset of image sensing pixels, and the second timepoint is temporally subsequent to the first timepoint. The acts also include generating a composite image frame based on the plurality of partial image frames.

Some embodiments include a system that has an image sensor comprising a plurality of image sensing pixels, one or more processors, and one or more hardware storage devices storing instructions that are executable by the one or more processors to configure the system to perform various acts. The acts include obtaining a runtime conditions measurement comprising (i) runtime light or (ii) runtime temperature. The acts also include, in response to determining that the runtime conditions measurement satisfies one or more thresholds, selectively activating a sampling mode for image acquisition. The sampling mode configures the system to utilize a subset of image sensing pixels of the image sensor to capture image frames. The subset of image sensing pixels comprising fewer than all image sensing pixels of the image sensor.

Some embodiments include an image sensor that includes a plurality of image sensing pixels and one or more integrated circuits configured to, in response to detecting activation of a sampling mode, selectively activate a first subset of image sensing pixels of the plurality of image sensing pixels to configure the first subset of image sensing pixels for photon detection while selectively refraining from activating a second subset of image sensing pixels of the plurality of image sensing pixels.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 4A-4D illustrate an additional example of capturing consecutive partial image frames of an object in a lighted environment using a SPAD array in a sampling mode;

DETAILED DESCRIPTION

Figure 1:
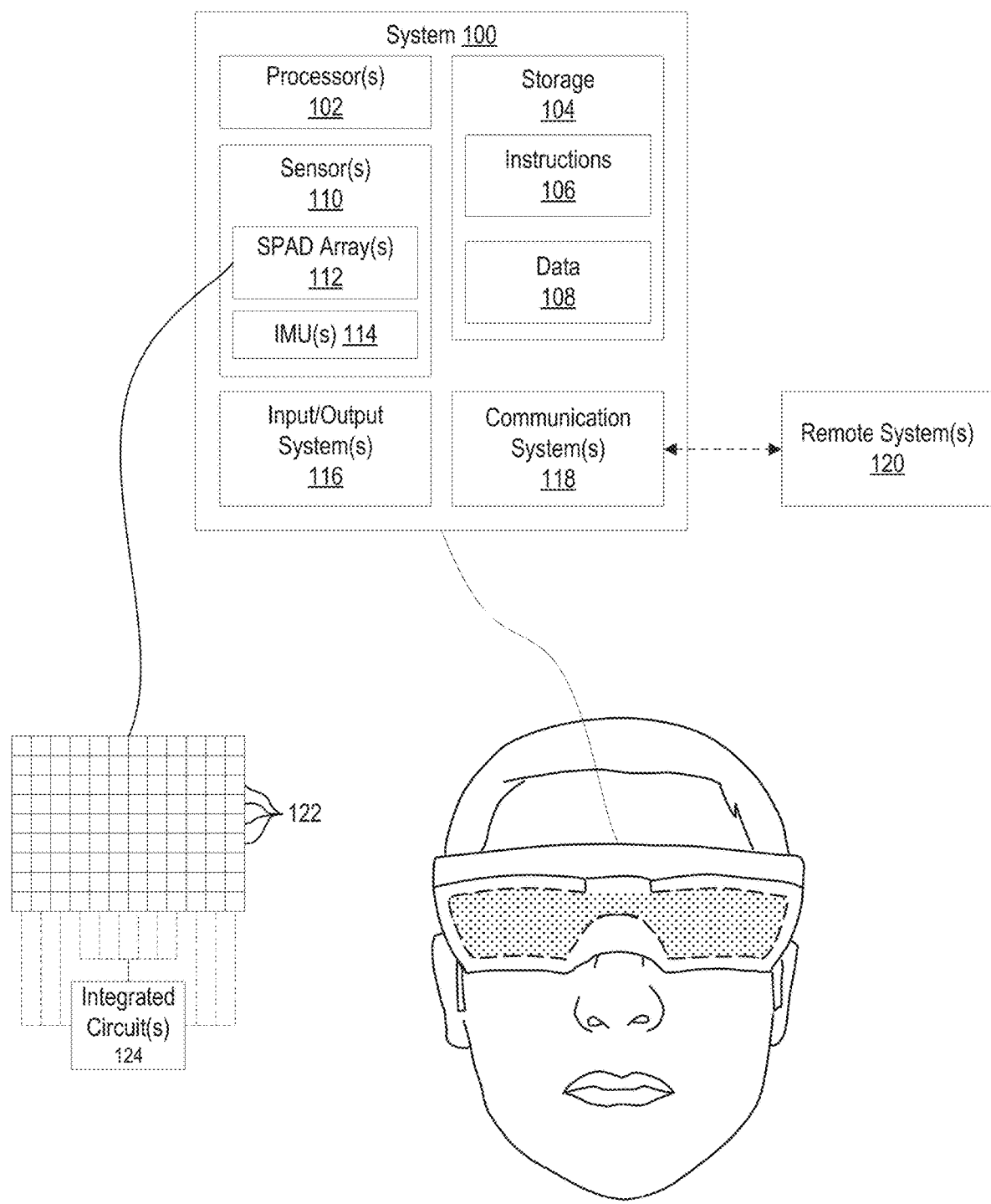
FIG. 1 illustrates example components of an example system that may include or be used to implement one or more disclosed embodiments.

Disclosed embodiments are generally directed to systems, methods, and devices for power efficient image acquisition using single photon avalanche diodes (SPADs).

Examples of Technical Benefits, Improvements, and Practical Applications

Those skilled in the art will recognize, in view of the present disclosure, that at least some of the disclosed embodiments may be implemented to address various shortcomings associated with at least some conventional image acquisition techniques. The following section outlines some example improvements and/or practical applications provided by the disclosed embodiments. It will be appreciated, however, that the following are examples only and that the embodiments described herein are in no way limited to the example improvements discussed herein.

The techniques described herein may facilitate a number of advantages over conventional systems, devices, and/or methods for SPAD image acquisition (including color image acquisition), particularly for imaging under illuminated conditions and/or high-temperature conditions.

For example, techniques of the present disclosure include operating an image sensor in a sampling mode for image acquisition. The sampling mode may be selectively activated in response to runtime conditions (e.g., temperature conditions and/or light conditions). The sampling mode causes systems to utilize one or more subsets of image sensing pixels of an image sensor to capture image frames of an environment. In some instances, consecutive image frames are captured using different subsets of image sensing pixels of the image sensor, and the consecutive image frames are combined or temporally filtered to generate a composite image.

Accordingly, techniques of the present disclosure may reduce the number of image sensing pixels used for image acquisition when runtime illumination and/or temperature conditions are high. By reducing the number of image sensing pixels used for image acquisition, systems employing techniques of the present disclosure may operate with reduced power consumption (e.g., fewer SPAD pixels may detect avalanche events, thereby reducing sensor power consumption) and/or may reduce temperature increases brought about by power consumption (e.g., thereby reducing the effects of dark current). Reduced power consumption may facilitate increased device battery life, reduced overall device heat, and/or other benefits.

Many of the examples described herein focus on image sensors embodied as SPAD arrays with a plurality of SPAD pixels. SPAD arrays may provide various benefits over conventional CMOS and/or CCD sensor, particularly when image acquisition functionality is desired for both low light environments and illuminated environments.

Initially, the binarization of the SPAD signal effectively eliminates read noise, thereby improving signal-to-noise ratio for SPAD image sensor arrays as compared with conventional CMOS and/or CCD sensors. Accordingly, because of the binarization of SPAD signal, a SPAD signal may be read out at a high framerate (e.g., 90 Hz or greater, such as 120 Hz or even 240 Hz) without causing the signal to be dominated by read noise, even for signals capturing a low number of photons under low light environments.

In view of the foregoing, multiple exposure (and readout) operations may be performed at a high framerate using a SPAD array to generate separate partial image frames, and these image frames may be temporally filtered with one another. The separate partial image frames may be aligned using motion data and combined (e.g., by averaging or other filtering) to form a single composite image. In this regard, SPAD images may be obtained in a temporally filtered manner (e.g., with persistence), using prior-timepoint image data to improve the quality of current-timepoint image data.

Although the present disclosure focuses, in at least some respects, on SPAD sensors that include a SPAD array with a plurality of SPAD pixels, it will be appreciated, in view of the present disclosure, that the principles described herein may apply to CMOS, CCD, and/or other types of image sensors. For example, image sensing pixels of any type of image sensor may be selectively activated and/or deactivated to facilitate image acquisition according to a sampling mode as discussed herein.

Having just described some of the various high-level features and benefits of the disclosed embodiments, attention will now be directed to FIGS. 1 through 8. These Figures illustrate various conceptual representations, architectures, methods, and supporting illustrations related to the disclosed embodiments.

Example Systems and Techniques for Power Efficient Image Acquisition Using SPADs Attention is now directed to FIG. 1, which illustrates an example system 100 that may include or be used to implement one or more disclosed embodiments. FIG. 1 depicts the system 100 as a head-mounted display (HMD) configured for placement over a head of a user to display virtual content for viewing by the user's eyes. Such an HMD may comprise an augmented reality (AR) system, a virtual reality (VR)

system, and/or any other type of HMD. Although the present disclosure focuses, in at least some respects, on a system 100 implemented as an HMD, it should be noted that the techniques described herein may be implemented using other types of systems/devices, without limitation.

FIG. 1 illustrates various example components of the system 100. For example, FIG. 1 illustrates an implementation in which the system includes processor(s) 102, storage 104, sensor(s) 110, I/O system(s) 116, and communication system(s) 118. Although FIG. 1 illustrates a system 100 as including particular components, one will appreciate, in view of the present disclosure, that a system 100 may comprise any number of additional or alternative components.

The processor(s) 102 may comprise one or more sets of electronic circuitries that include any number of logic units, registers, and/or control units to facilitate the execution of computer-readable instructions (e.g., instructions that form a computer program). Such computer-readable instructions may be stored within storage 104. The storage 104 may comprise physical system memory and may be volatile, non-volatile, or some combination thereof. Furthermore, storage 104 may comprise local storage, remote storage (e.g., accessible via communication system(s) 116 or otherwise), or some combination thereof. Additional details related to processors (e.g., processor(s) 102) and computer storage media (e.g., storage 104) will be provided hereinafter.

In some implementations, the processor(s) 102 may comprise or be configurable to execute any combination of software and/or hardware components that are operable to facilitate processing using machine learning models or other artificial intelligence-based structures/architectures. For example, processor(s) 102 may comprise and/or utilize hardware components or computer-executable instructions operable to carry out function blocks and/or processing layers configured in the form of, by way of non-limiting example, single-layer neural networks, feed forward neural networks, radial basis function networks, deep feed-forward networks, recurrent neural networks, long-short term memory (LSTM) networks, gated recurrent units, autoencoder neural networks, variational autoencoders, denoising autoencoders, sparse autoencoders, Markov chains, Hopfield neural networks, Boltzmann machine networks, restricted Boltzmann machine networks, deep belief networks, deep convolutional networks (or convolutional neural networks), deconvolutional neural networks, deep convolutional inverse graphics networks, generative adversarial networks, liquid state machines, extreme learning machines, echo state networks, deep residual networks, Kohonen networks, support vector machines, neural Turing machines, and/or others.

As will be described in more detail, the processor(s) 102 may be configured to execute instructions 106 stored within storage 104 to perform certain actions associated with image acquisition. The actions may rely at least in part on data 108 (e.g., avalanche event counting or tracking, etc.) stored on storage 104 in a volatile or non-volatile manner.

In some instances, the actions may rely at least in part on communication system(s) 118 for receiving data from remote system(s) 120, which may include, for example, separate systems or computing devices, sensors, and/or others. The communications system(s) 120 may comprise any combination of software or hardware components that are operable to facilitate communication between on-system components/devices and/or with off-system components/devices. For example, the communications system(s) 120 may comprise ports, buses, or other physical connection apparatuses for communicating with other devices/components. Additionally, or alternatively, the communications system(s) 120 may comprise systems/components operable to communicate wirelessly with external systems and/or devices through any suitable communication channel(s), such as, by way of non-limiting example, Bluetooth, ultra-wideband, WLAN, infrared communication, and/or others.

FIG. 1 illustrates that a system 100 may comprise or be in communication with sensor(s) 110. Sensor(s) 110 may comprise any device for capturing or measuring data representative of perceivable phenomenon. By way of non-limiting example, the sensor(s) 110 may comprise one or more image sensors, microphones, thermometers, barometers, magnetometers, accelerometers, gyroscopes, and/or others.

FIG. 1 also illustrates that the sensor(s) 110 include SPAD array(s) 112. As depicted in FIG. 1, a SPAD array 112 comprises an arrangement of SPAD pixels 122 that are each configured to facilitate avalanche events in response to sensing a photon, as described hereinabove. SPAD array(s) 112 may be implemented on a system 100 (e.g., an MR HMD) to facilitate image capture for various purposes (e.g., to facilitate computer vision tasks, pass-through imagery, and/or others).

FIG. 1 also illustrates the SPAD pixels 122 of the SPAD array(s) 112 as being connected to and/or controllable by integrated circuit(s) 124. Integrated circuit(s) 124 may comprise one or more analog, digital, and/or mixed signal integrated circuits that include one or more logic circuitries for controlling operation of the SPAD pixels 122 of the SPAD array(s) 112. For example, integrated circuit(s) 124 may comprise one or more field-programmable gate arrays (FPGAs), microprocessors, digital memory chips, application-specific integrated circuits (ASICs), and/or others. As will be described in more detail hereinafter, the integrated circuit(s) 124 may be used to selectively activate or deactivate certain subsets of SPAD pixels 122 of the SPAD array(s) 112 (or other image sensing pixels of any image sensor) to facilitate image capture in accordance with a sampling mode.

FIG. 1 also illustrates that the sensor(s) 110 include inertial measurement unit(s) 114 (IMU(s) 114). IMU(s) 114 may comprise any number of accelerometers, gyroscopes, and/or magnetometers to capture motion data associated with the system 100 as the system moves within physical space. The motion data may comprise or be used to generate pose data, which may describe the position and/or orientation (e.g., 6 degrees of freedom pose) and/or change of position (e.g., velocity and/or acceleration) and/or change of orientation (e.g., angular velocity and/or angular acceleration) of the system 100.

Furthermore, FIG. 1 illustrates that a system 100 may comprise or be in communication with I/O system(s) 116. I/O system(s) 116 may include any type of input or output device such as, by way of non-limiting example, a touch screen, a mouse, a keyboard, a controller, and/or others, without limitation. For example, the I/O system(s) 116 may include a display system that may comprise any number of display panels, optics, laser scanning display assemblies, and/or other components.

Figure 2A:
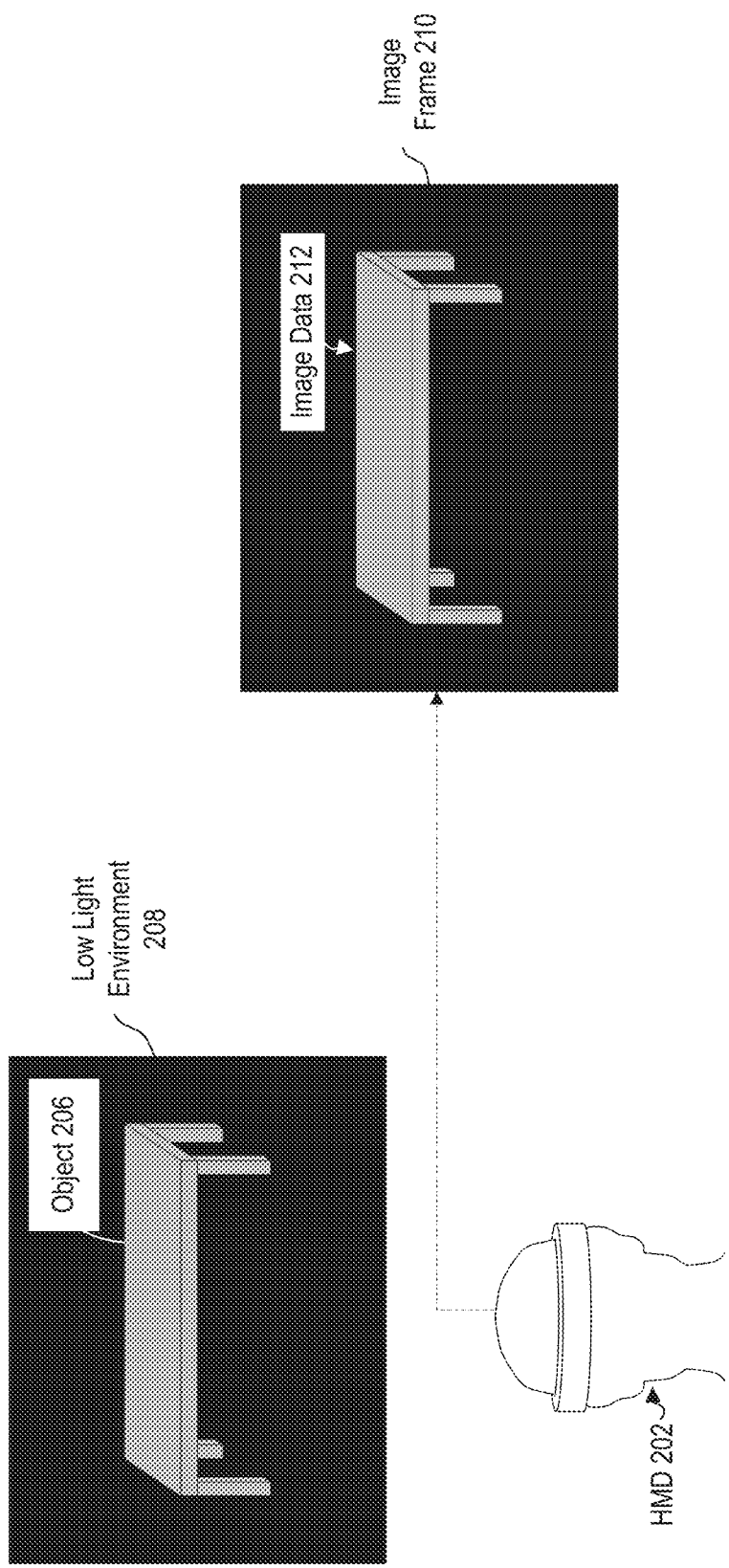
FIG. 2A illustrates an example of capturing an image frame of an object in a low light environment using a single photon avalanche diode (SPAD) array of a head-mounted display (HMD)

Attention is now directed to FIG. 2A, which illustrates an example of capturing an image frame 210 of an object 206 (e.g., a table) in a low light environment 208 using a single photon avalanche diode (SPAD) array of a head-mounted display 202 (HMD 202). The HMD 202 corresponds, in at least some respects, to the system 100 disclosed hereinabove. For example, the HMD 202 includes a SPAD array (e.g., SPAD array(s) 112) that includes SPAD pixels (e.g., SPAD pixels 122) configured for photon detection to capture images (even in low light environments).

FIG. 2A illustrates image data 212 of the image frame 210 depicting the object 206. The image data 212 may comprise intensity values determined based on the per-pixel quantity of avalanche events detected by the SPAD pixels of the SPAD array(s) of the HMD 202. When imaging under low light conditions, as depicted in FIG. 2A, SPAD pixels of a SPAD array may consume relatively little power (e.g., as a result of detecting relatively few photons). However, when runtime lighting conditions increase, SPAD pixels may consume more power (e.g., as a result of detecting more photons and therefore triggering more avalanche events). Accordingly, at least some techniques of the present disclosure include operating SPAD sensors in a power-efficient manner that accommodates for high-light environments (and/or high-temperature environments).

Figure 2B:
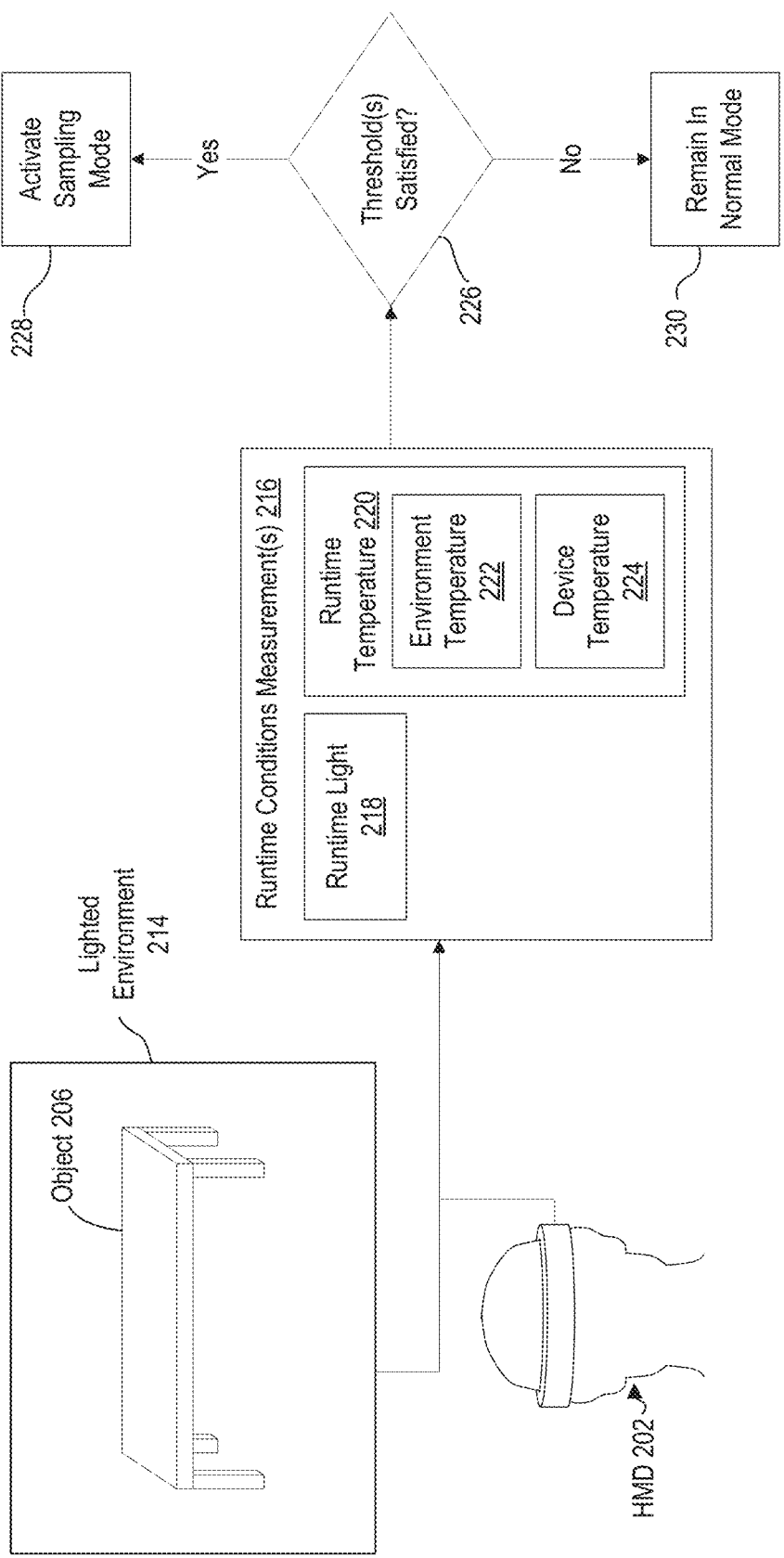
FIG. 2B illustrates a conceptual representation of activating a sampling mode based on one or more runtime conditions measurements.

FIG. 2B illustrates a conceptual representation of activating a sampling mode based on one or more runtime conditions measurements. In particular, FIG. 2B shows the object 206 within a lighted environment 214, in contrast with the low light environment 208 of FIG. 2A. The lighted environment 214 may cause SPADs of the HMD 202 to detect additional avalanche events, thereby increasing system power consumption. Accordingly, FIG. 2B illustrates runtime conditions measurement(s) 216 determined based on conditions associated with the captured environment (e.g., lighted environment 214) and/or conditions associated with the HMD 202 and/or components thereof. The runtime conditions measurement(s) 216 may comprise runtime light 218, runtime temperature 220, and/or other metrics.

Runtime light 218 may be determined in various ways, without limitation. One example technique for determining runtime light is based on gray level counts detected by an image sensor of the HMD 202 (e.g., the SPAD array(s) 112 of the HMD 202, or another sensor thereof). For example, a number of counts may be measured over an exposure time associated with the image sensor of the HMD to estimate runtime light 218.

Runtime temperature 220 may comprise various components, such as environment temperature 222 and/or device temperature 224. Environment temperature 222 may be determined based on one or more temperature sensors (e.g., sensor(s) 110) of the HMD 202 for measuring the ambient temperature of the environment surrounding the HMD 202 at runtime. Device temperature 224 may be determined based on one or more temperature sensors (e.g., sensor(s) 110) of the HMD 202 for measuring temperature of one or more devices of the HMD 202, such as SPAD array(s) 112 of the HMD 202 (or other image sensors thereof), display systems of the HMD 202, processing units of the HMD 202, and/or others.

Any combination of runtime conditions measurement(s) 216 may be obtained in accordance with the present disclosure. In some implementations, a system compares the runtime conditions measurement(s) 216 to one or more thresholds to determine whether the runtime conditions measurement(s) 216 satisfy the one or more thresholds (as indicated in FIG. 2B by decision block 226 stating "Threshold(s) Satisfied?"). By way of non-limiting example, a threshold device temperature 224 may be 40° C., a threshold environment temperature 222 may be 30° C., and a threshold runtime light 218 may be 300 lux.

FIG. 2B illustrates that if the runtime conditions measurement(s) 216 are determined to satisfy the threshold(s), a system may active a sampling mode (as indicated in FIG. 2B by block 228). In contrast, if the runtime conditions measurement(s) 216 are determined to fail to satisfy the threshold(s), a system may refrain from activating the sampling mode and instead remain in a normal image acquisition mode (as indicated in FIG. 2B by block 230). A "sampling mode" as used herein refers to an image acquisition mode wherein only one or more subsets of image sensing pixels (e.g., SPAD pixels 122) of an image sensor (e.g., SPAD array 112) are used to capture images of environments. For example, the integrated circuit(s) 124 of a SPAD array 112 may selectively activate one subset of SPAD pixels of the SPAD array 112 (thereby configuring the subset of SPAD pixels for photon detection to detect avalanche events) while selectively refraining from activating another subset of SPAD pixels of the SPAD array 112 (thereby refraining from configuring the other subset of SPAD pixels for photon detection).

Accordingly, fewer than all image sensing pixels of an image sensor may be selectively used to capture images of an environment, thereby allowing the image sensor to advantageously operate in a reduced power mode or in a power saving mode.

Figure 2C:
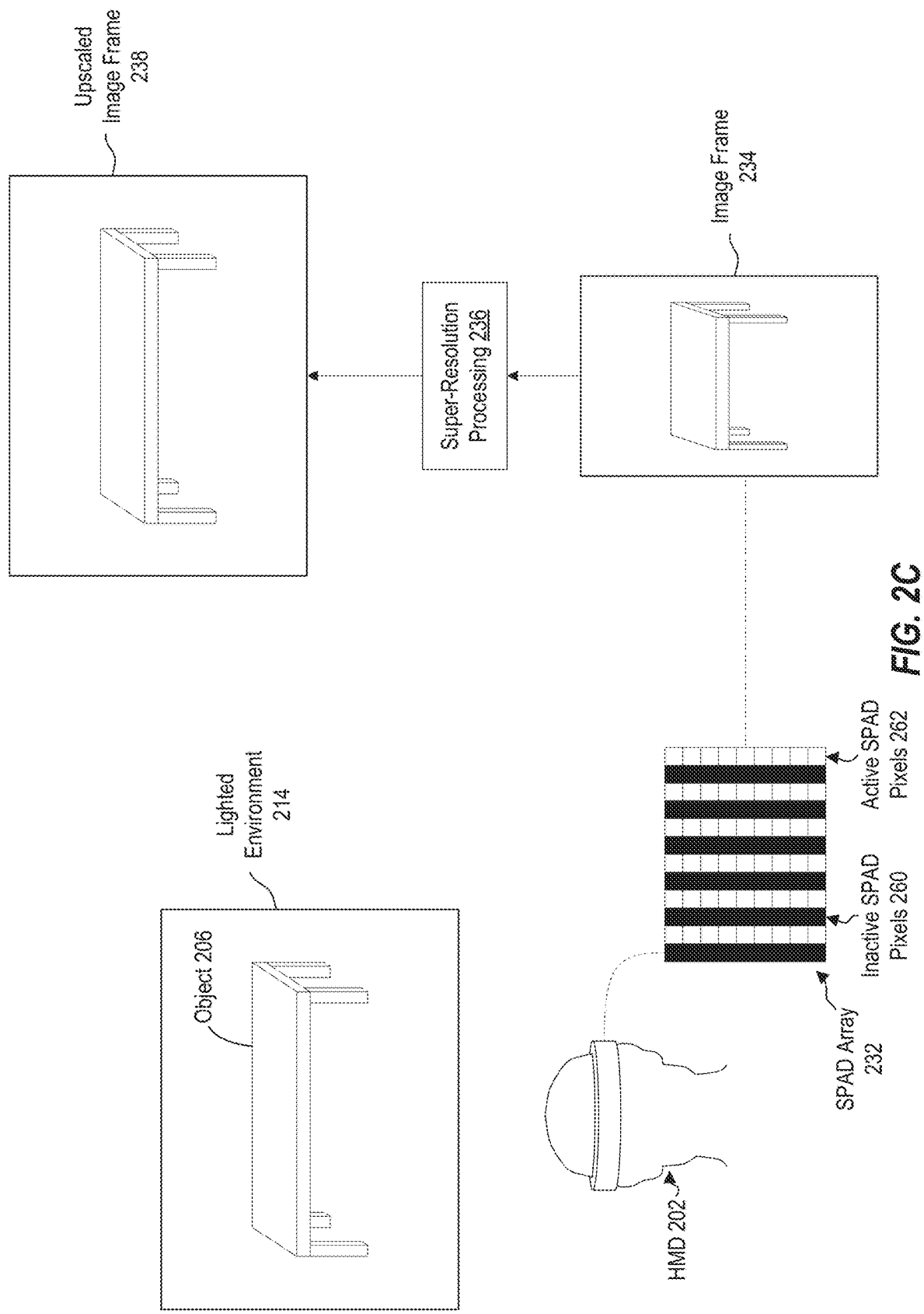
FIGS. 2C-2E illustrate examples of capturing image frames of an object in a lighted environment using a SPAD array of an HMD in a sampling mode.
Figure 2D:
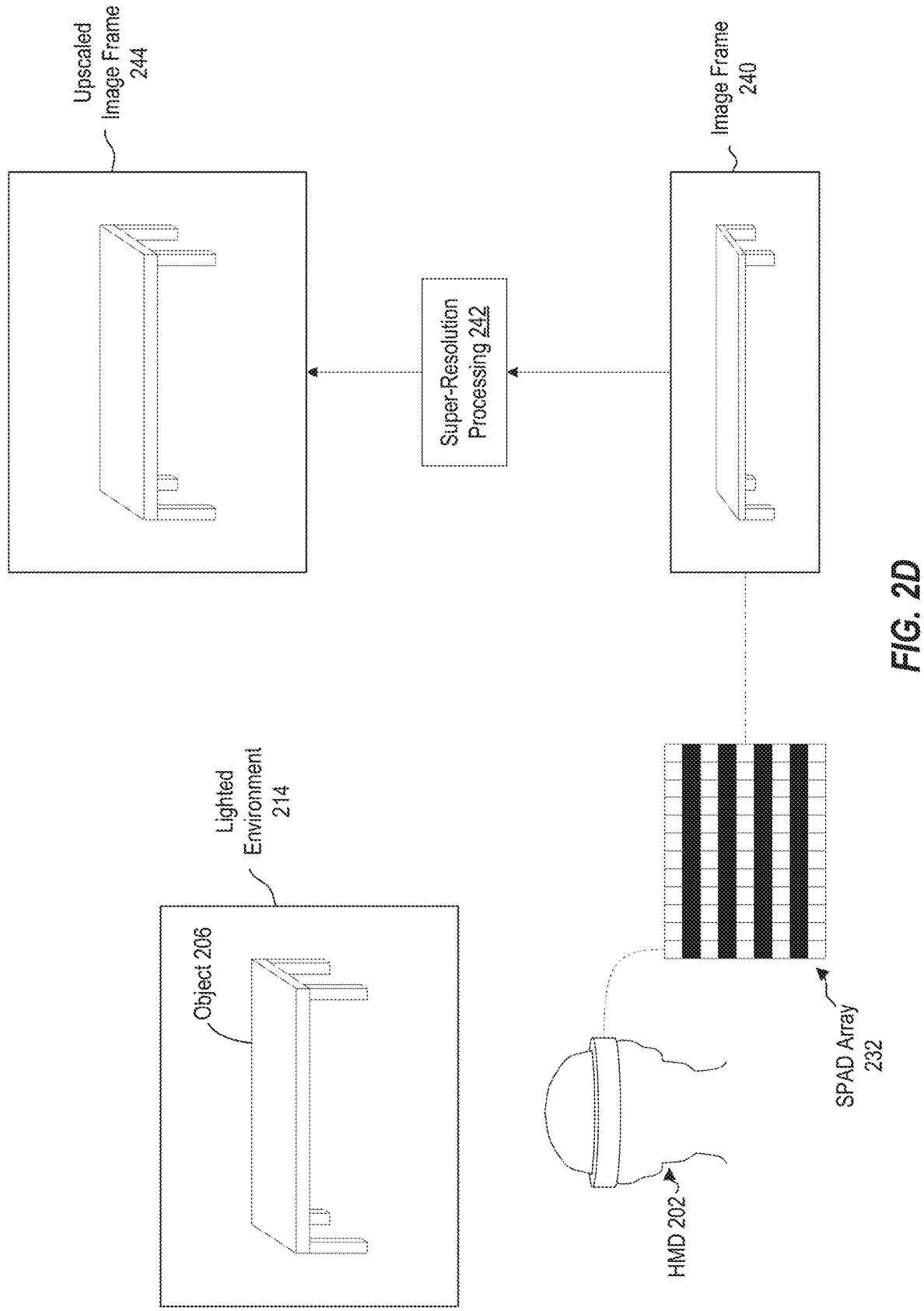
Figure 2E:
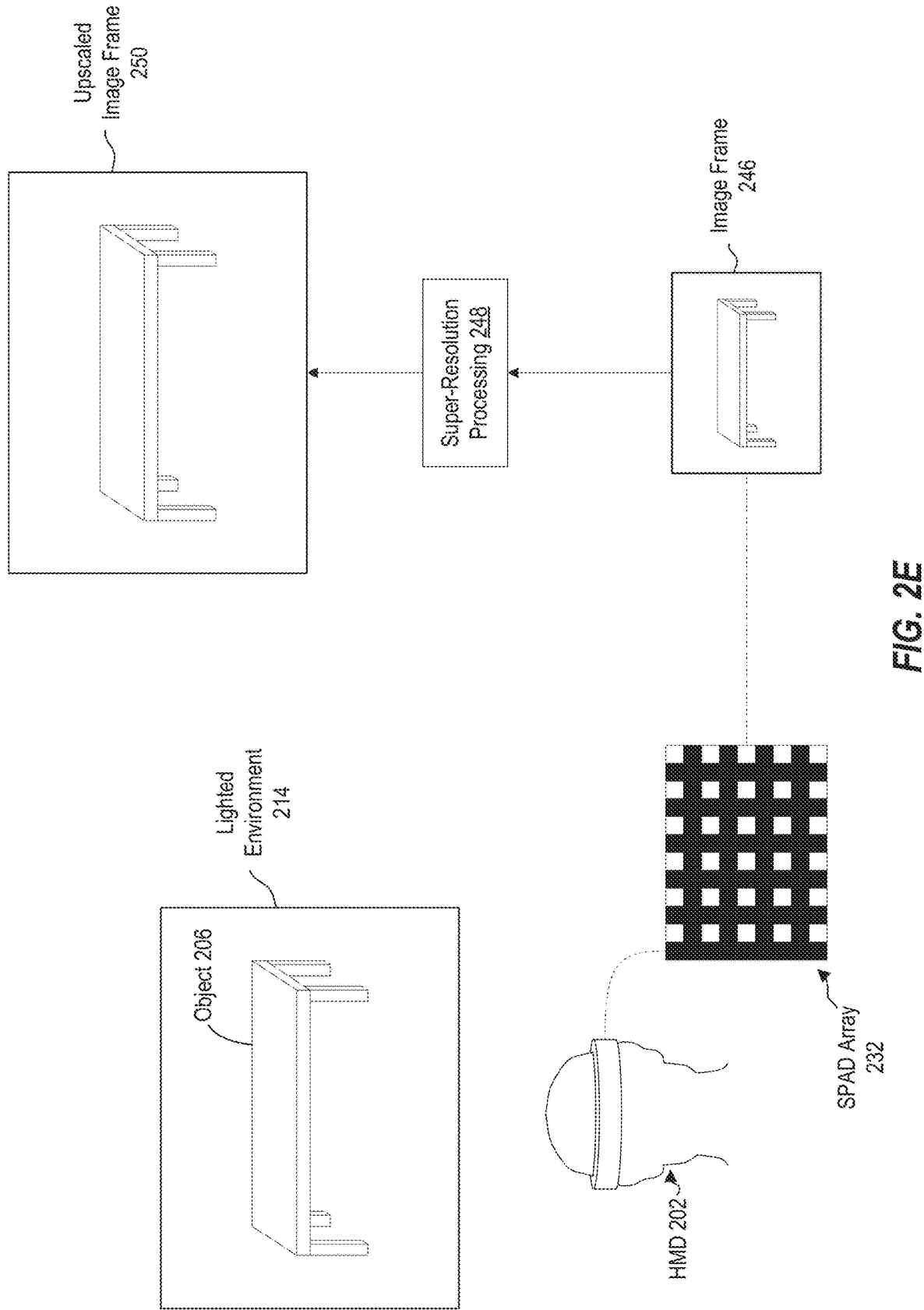

FIGS. 2C-2E illustrate examples of capturing image frames of an object in a lighted environment using a SPAD array of an HMD in a sampling mode. In particular, FIG. 2C illustrates the HMD 202 capturing the object 206 in the lighted environment 214 as discussed above. FIG. 2C illustrates a SPAD array 232 of the HMD 202, which may generally correspond to the SPAD array(s) 112 discussed hereinabove. The SPAD array 232 of the HMD 202 of FIG. 2C is reconfigured (e.g., utilizing integrated circuit(s) 124) in a sampling mode, wherein only a subset of the SPAD pixels of the SPAD array 232 are activated for photon detection to capture the object 206 in the lighted environment 214. The SPAD array 232 may become reconfigured according to the sampling mode in response to the runtime conditions measurement(s) 216 satisfying a threshold (e.g., the illumination of the lighted environment 214 may cause the runtime light 218 to satisfy a threshold).

FIG. 2C illustrates a configuration of a sampling mode in which every other column of SPAD pixels of the SPAD array 232 is activated to detect photons for generating an image. Inactive SPAD pixels 260 of the SPAD array 232 are illustrated in FIG. 2C with black squares (arranged to form black bars), whereas active SPAD pixels 262 of the SPAD array 232 are illustrated in FIG. 2C with white squares. In the example shown in FIG. 2C, using active SPAD pixels 262 (and refraining from using the inactive SPAD pixels 260), the HMD 202 may utilize the SPAD array 232 to capture an image frame 234 of the object 206 in the lighted environment 214. As is evident from FIG. 2C, the image frame 234 comprises a reduced image resolution in the horizontal dimension (e.g., relative to the image resolution of the image frame 210 of FIG. 2A captured under a normal image acquisition mode) in view of the inactive columns of SPAD pixels of the SPAD array 232.

Although the image frame 234 may be used for any desired purpose (e.g., passthrough imaging, depth imaging, simultaneous localization and mapping, object tracking, and/or other functions), in some instances, super-resolution processing 236 is performed on the image frame 234 to generate an upscaled image frame 238. The upscaled image frame 238 comprises an image resolution that is greater than the image resolution of the image frame 234 (e.g., at least in the horizontal dimension, to compensate for the inactive columns of SPAD pixels 260 of the SPAD array 232). In the example shown in FIG. 2C, the upscaled image frame 238 comprises an image resolution that matches the image resolution of image frame 210 captured under a normal image acquisition mode (however, other image resolutions for the upscaled image frame 238 are within the scope of the present disclosure).

Super-resolution processing 236 may include one or more upsampling algorithms configured to generate a high-resolution image from one or more low-resolution images. For example, super-resolution processing 236 to generate a high-resolution image from one or more low-resolution images may employ techniques such as spatial domain approaches (e.g., sample transformation using the sampling theorem and the Nyquist theorem), frequency domain approaches (e.g., registering images using properties of the discrete Fourier transform), learning based techniques (e.g., adaptive regularization, pair matching, etc.), iterative reconstruction and interpolation based techniques (e.g., iterative back projection, pixel replication, nearest-neighbor interpolation, bilinear or bicubic interpolation, etc.), dynamic tree and wavelet based resolution techniques (e.g., mean field approaches), filtering techniques (e.g., edge-preserving filtering operations such as joint bilateral filter, guided filter, bilateral solver, etc.) and/or others.

Although FIG. 2C illustrates an example configuration where a sampling mode causes columns of SPAD pixels of the SPAD array 232 to be deactivated or remain inactive for the capturing of an image frame (e.g., image frame 234), other configurations may be used. For example, FIG. 2D illustrates the SPAD array 232 of the HMD 202 capturing the object 206 in the lighted environment 214 in a sampling mode where every other row of the SPAD array is activated for detecting photons to facilitate image acquisition. Accordingly, the image frame 240 comprises a reduced image resolution in the vertical dimension (relative to the image resolution of the image frame 210 of FIG. 2A captured under a normal image acquisition mode) in view of the inactive rows of SPAD pixels of the SPAD array 232. Super-resolution processing 242 may similarly be performed to generate an upscaled image frame 244 based on the image frame 240.

Furthermore, FIG. 2E illustrates the SPAD array 232 of the HMD 202 capturing the object 206 in the lighted environment 214 in a sampling mode where one quarter of the SPAD pixels of the SPAD array 232 are activated for detecting photons to facilitate image acquisition. For example, for each 2×2 block of SPAD pixels, only one SPAD pixel is active for photon detection during image acquisition. Accordingly, the image frame 246 comprises a reduced resolution in both the horizontal dimension and the vertical dimension (e.g., relative to the image resolution of the image frame 210 of FIG. 2A captured under a normal image acquisition mode). Super-resolution processing 248 may be performed to generate an upscaled image frame 250 based on the image frame 246.

As is evident from FIGS. 2C-2E, different configurations of active SPAD pixels for image acquisition under a sampling mode can result in different image resolutions for captured image frames (e.g., compare image frames 234, 240, and 246). Furthermore, the configuration of active SPAD pixels used to capture image frame 246 includes fewer SPAD pixels than the configurations of active SPAD pixels used to capture image frames 234, 240, and 246. Thus, the configuration of active SPAD pixels used to capture image frame 246 (with 25% of the SPAD pixels active) may facilitate a greater reduction in power consumption than the configuration of active SPAD pixels used to capture image frames 234 and 240. In this regard, in some instances, the quantity or ratio of active SPAD pixels used in a sampling mode is dynamically determined based on the runtime conditions measurement(s) 216. For instance, multiple thresholds may be used to trigger different configurations of active SPAD pixels for a sampling mode. By way of example, a runtime light 218 of about 300 lux may trigger a sampling mode where 50% of the SPAD pixels are activated for image acquisition (e.g., as shown by example in FIGS. 2C and 2D), and a runtime light 218 of about 1000 lux may trigger a sampling mode where 25% of the SPAD pixels are activated for image acquisition (e.g., as shown by example in FIG. 2E). Other quantities and/or ratios for other light levels and/or runtime temperatures may be used.

In some implementations, a sampling mode causes a system to utilize different subsets of image sensing pixels of an image sensor to capture different temporally consecutive image frames. The different temporally consecutive image frames may be combined to form composite images. In some instances, such composite images captured under the sampling mode may advantageously comprise an image resolution that matches an image resolution defined for images captured under a normal image acquisition mode (without having to perform super-resolution processing).

Figure 3A:
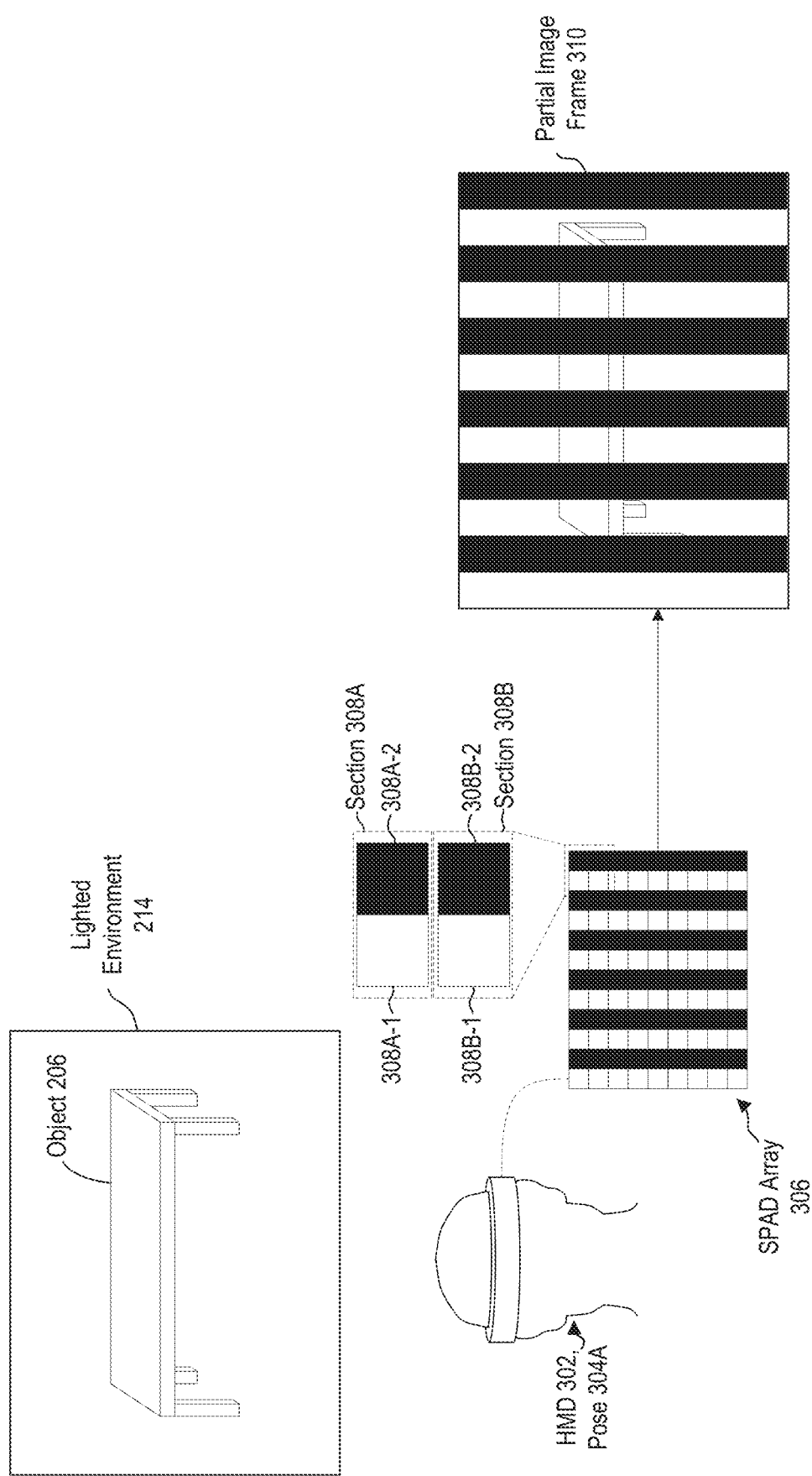
FIGS. 3A and 3B illustrate an example of capturing consecutive partial image frames of an object in a lighted environment using a SPAD array of an HMD in a sampling mode.
Figure 3B:
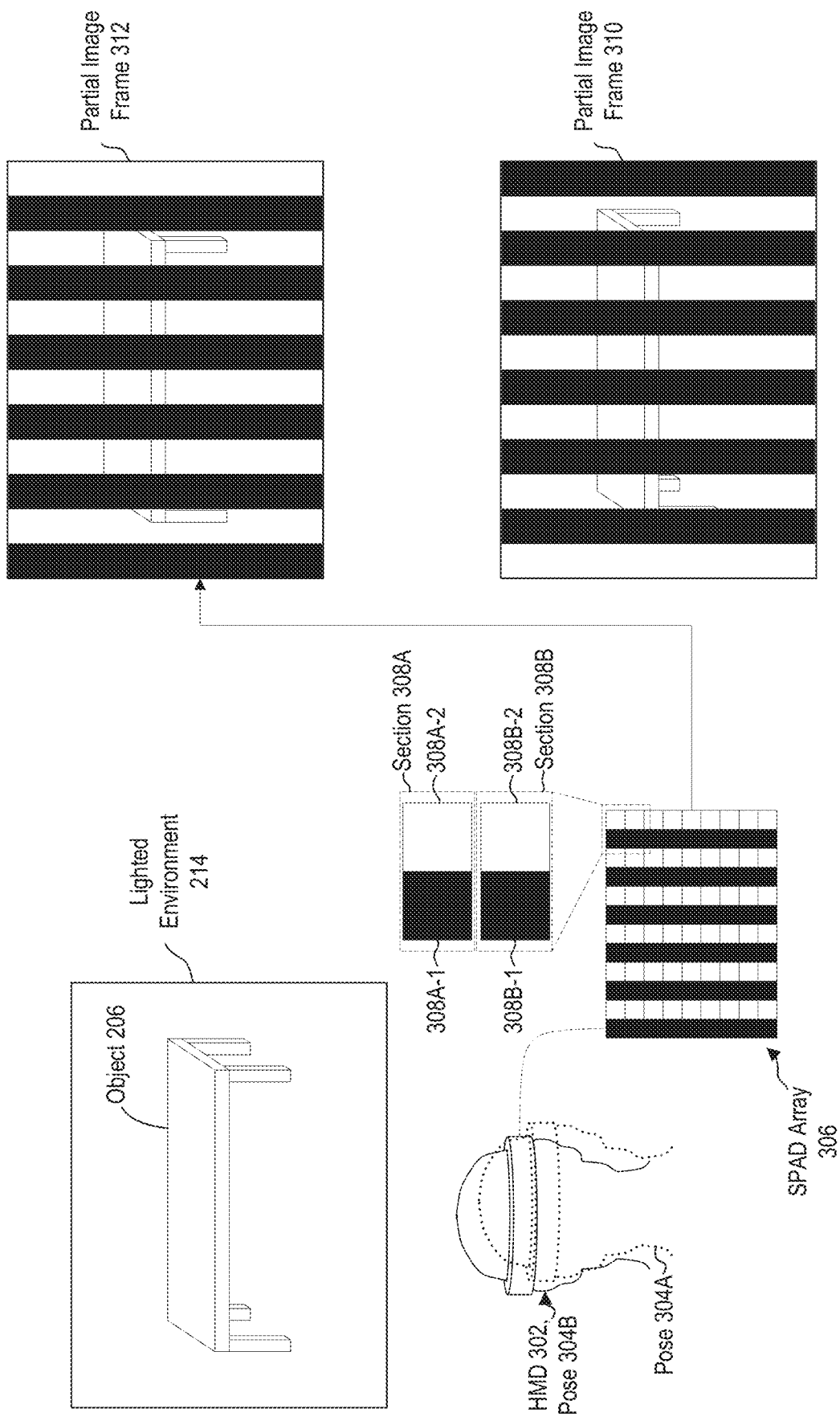

Accordingly, FIGS. 3A and 3B illustrate an example of capturing consecutive partial image frames of the object 206 in the lighted environment 214 using a SPAD array 306 of an HMD 302 in a sampling mode. The HMD 302 and the SPAD array 306 may generally correspond to other HMDs and SPAD arrays described herein. FIG. 3A illustrates the SPAD array 306 of the HMD 302 capturing the object 206 in the lighted environment 214 while the HMD 302 is positioned according to pose 304A. The pose 304A may be tracked or measured utilizing sensors (e.g., IMU(s) 114, camera(s) to facilitate simultaneous localization and mapping, etc.) of the HMD 302.

FIG. 3A illustrates the SPAD array 306 with certain columns of SPAD pixels activated for image acquisition (e.g., the odd columns being activated). For example, the SPAD array 306 may be divided into sections that each comprise two adjacent SPAD pixels (e.g., section 308A comprising SPAD pixels 308A-1 and 308A-2, and section 308B comprising SPAD pixels 308B-1 and 308B-2, and so forth). A first subset of SPAD pixels used to capture the partial image frame 310 of FIG. 3A may include a first SPAD pixel from each of the different sections of SPAD pixels (e.g., SPAD pixel 308A-1 of section 308A and SPAD pixel 308B-1 of section 308B, and so forth).

As is evident from FIG. 3A, the representation of the partial image frame 310 captured using the first subset of SPAD pixels (SPAD pixels 308A-1, 308B-1, and so forth) includes placeholder pixels (shown as black vertical bars) that indicate portions of the captured environment that would have been detected by the SPAD pixels of the SPAD array 306 that were inactive for the capturing of the partial image frame 310 (the size of the image pixels relative to the partial image frame 310 is exaggerated for clarity). Thus, partial image frame 310 may appear as though it is missing image data when conceptually expanded to include the placeholder pixels as shown in FIG. 3A. However, as will be discussed hereafter, the apparently missing image data may be obtained by utilizing a different subset of SPAD pixels (e.g., SPAD pixels not included in the first subset of SPAD pixels discussed above) to capture a subsequent partial image frame for combination with the partial image frame 310.

Accordingly, FIG. 3B illustrates the HMD 302 positioned according to pose 304B while capturing the object 206 in the lighted environment 214 (pose 304A is illustrated in FIG. 3B for reference). FIG. 3B shows the SPAD array 306 with a different configuration of active columns of SPAD pixels (e.g., with the even columns being activated) relative to the configuration shown in FIG. 3A. For instance, a second subset of SPAD pixels used to capture the partial image frame 312 of FIG. 3B may include a respective second SPAD pixel from each of the different sections of SPAD pixels (e.g., SPAD pixel 308A-2 of section 308A and SPAD pixel 308B-2 of section 308B, and so forth). Partial image frame 312 is captured at a timepoint (e.g., when the HMD is positioned according to pose 304B) that is temporally subsequent to a timepoint associated with the capturing of partial image frame 310 (e.g., the timepoint when the HMD was positioned according to pose 304A).

Because different subsets of SPAD pixels of the SPAD array 306 are used to capture the different partial image frames 310 and 312, the image data of the partial image frames 310 and 312 may complement one another in capturing the subject environment (e.g., lighted environment 214 including object 206). For example, the previously mentioned apparently missing image data of partial image frame 310 may be supplemented with the image data of the partial image frame 312 to complete the representation of the captured scene. Similarly, the apparently missing image data of the partial image frame 312 as shown in FIG. 3B may be supplemented with the image data of the partial image frame 310 to complete the represented of the captured scene.

Figure 3C:
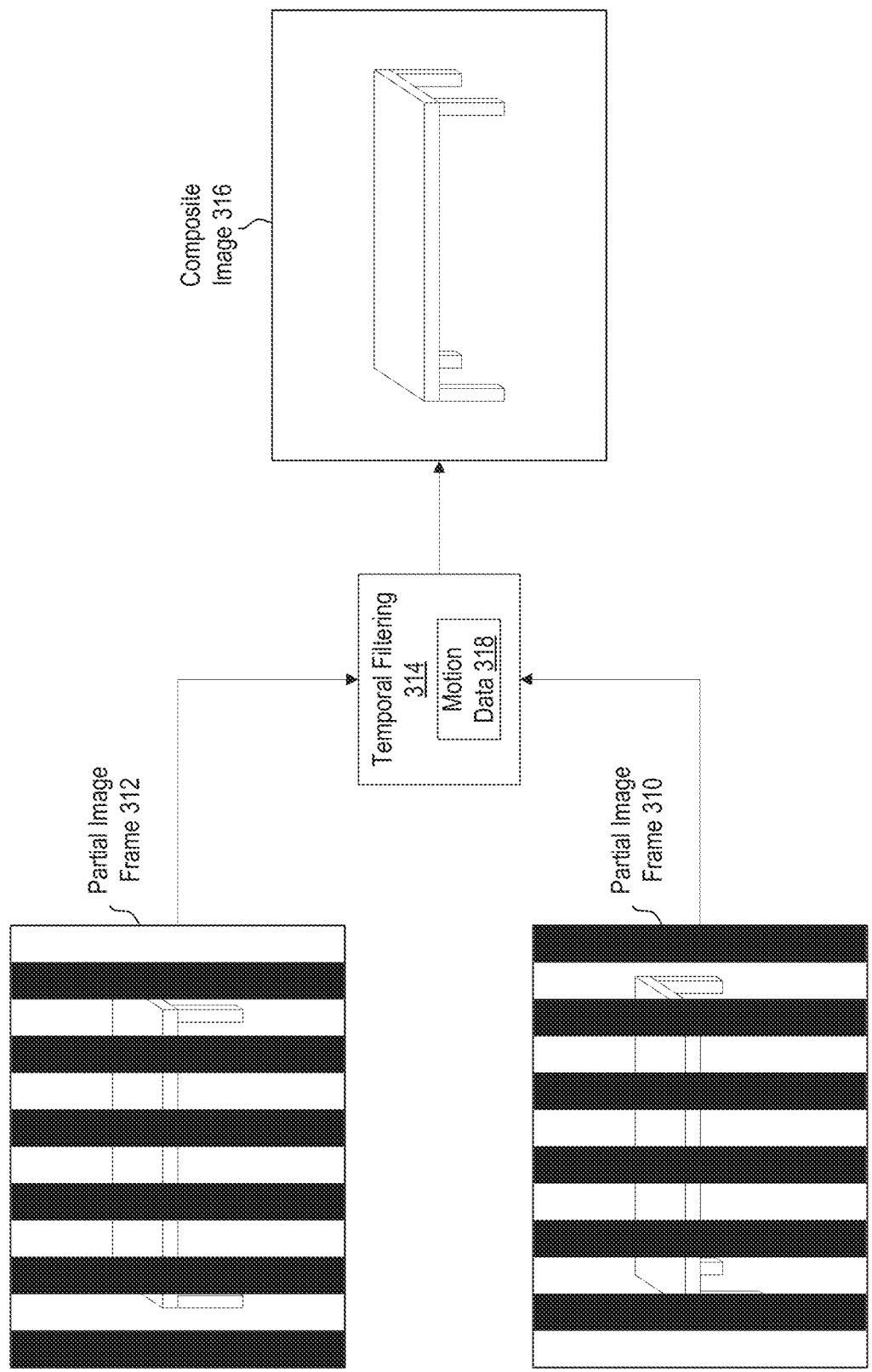
FIGS. 3C and 3D illustrate examples of combining consecutively captured partial image frames to generate composite images.

FIG. 3C illustrates the partial image frames 312 and 310 discussed hereinabove with reference to FIGS. 3A and 3B being composited or combined with one another via temporal filtering 314 to generate a composite image 316. Temporal filtering 314 may include using image pixels of the different image frames (e.g., partial image frames 310 and 312) to generate pixel values for an output image (i.e., composite image 316).

Image pixels of the different image frames may be combined or composited in various ways, such as by summing, averaging (e.g., weighted averaging), alpha blending, and/or others, and the manner/parameters of combining corresponding image pixels may differ for different pixel regions and/or may be dynamically determined based on various factors (e.g., signal strength, amount of motion, motion detected in a captured scene, etc.).

In some instances, the partial image frames 310 and 312 capture the object 206 from poses that are at least slightly different from one another. For example, the HMD 302 may capture the partial image frames 310 and 312 from poses 304A and 304B, respectively, which may at least slightly differ from one another. Accordingly, in some instances, temporal filtering 314 may include utilizing motion data 318 to align the partial image frames 310 and 312 with one another. Motion data 318, may comprise or be used to generate pose data that describes the position and/or orientation (e.g., 6 degrees of freedom pose) and/or change of position (e.g., velocity and/or acceleration) and/or change of orientation (e.g., angular velocity and/or angular acceleration) of the HMD 302 (and/or the SPAD array 306) during the capturing of the partial image frames 310 and 312.

As noted above, the motion data 318 may be used to align the partial image frames 310 and 312 with one another. For example, a system may use the motion data 318 to align partial image frames 310 with pose 304B of partial image frame 312, thereby generating aligned image frames that are spatially aligned with one another (e.g., appearing as though they were captured from pose 304B with the same capture perspective). In this regard, the temporal filtering 314 may comprise motion compensated temporal filtering.

In some instances, temporal filtering 314 additionally or alternatively utilizes optical flow estimations to align the partial image frames 310 and 312 to facilitate image compositing to generate a composite image 316. For example, in some instances, a system upsamples the consecutively captured partial image frames and performs optical flow analysis to obtain vectors for aligning the pixels of the consecutively captured image frames. Furthermore, although the present disclosure focuses, in at least some respects, on temporal filtering operations that utilize image frames that temporally precede an image frame associated with a target timepoint to generate a composite image associated with the target timepoint, temporal filtering operations may additionally or alternatively utilize at least some image frames that are temporally subsequent to an image frame associated with a target timepoint to generate a composite image associated with the target timepoint.

As is depicted in FIG. 3C, the composite image 316 comprises an image resolution that corresponds to the image resolution of the image frame 210 captured under a normal image acquisition mode (see FIG. 2A). Accordingly, because the partial image frames 310 and 312 are both captured using subsets of SPAD pixels, both of the partial image frames 310 and 312 may be separately captured with reduced power consumption. Furthermore, because the partial image frames 310 and 312 are captured using complementary subsets of SPAD pixels, the partial image frames 310 and 312 may comprise complementary image data that can be combined by temporal filtering/motion compensation to provide a composite image (which may comprise the same image resolution as would be available when using all SPAD pixels of a SPAD array to capture an image).

The example discussed with reference to FIG. 3C focuses on a particular configuration for first and second subsets of SPAD pixels (using alternating columns of SPAD pixels) for capturing first and second temporally consecutive partial image frames to generate a composite image. Other configurations for different subsets of SPAD pixels for capturing temporally consecutive partial image frames are within the scope of the present disclosure.

Figure 3D:
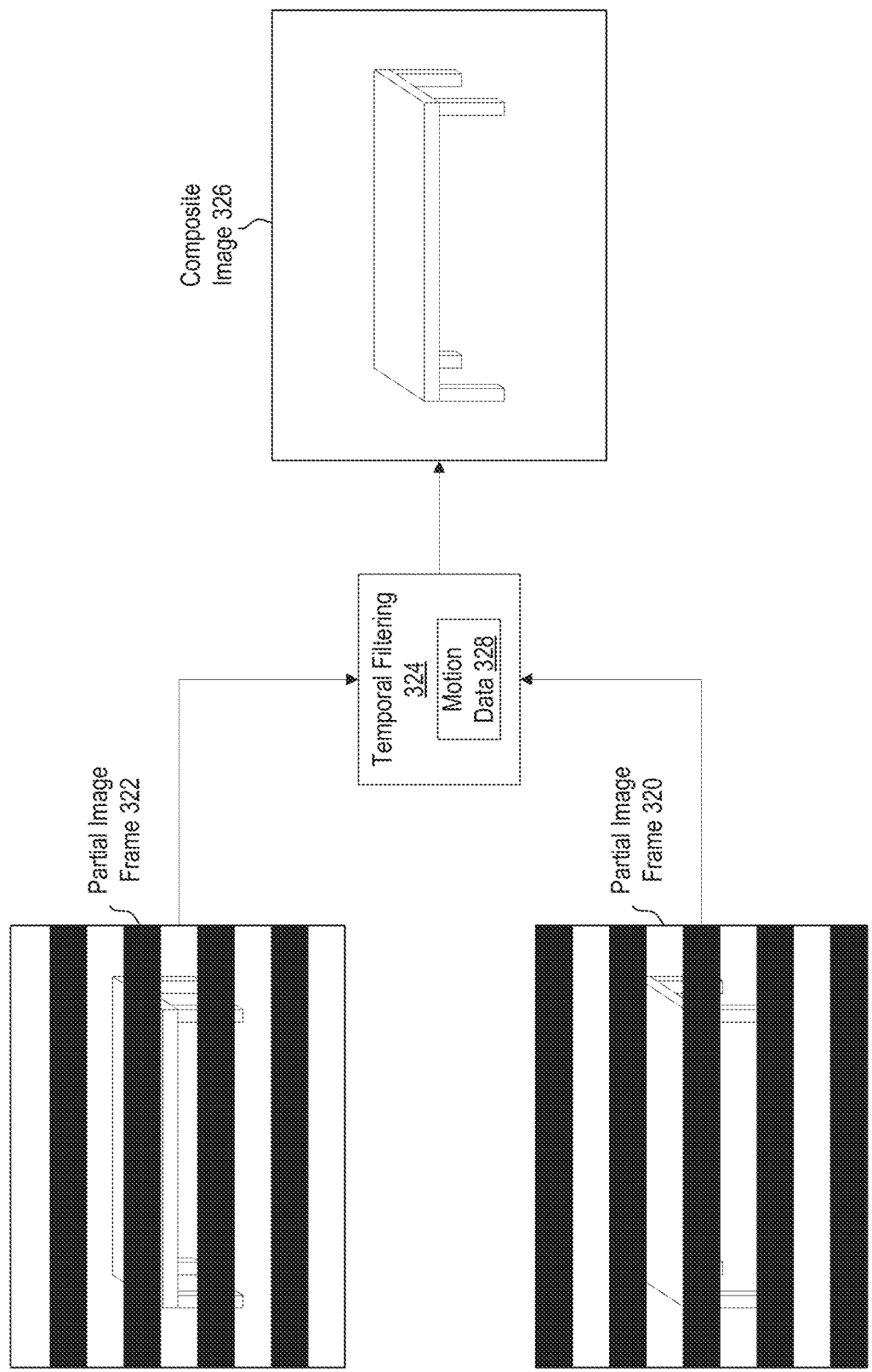

For example, FIG. 3D illustrates example partial image frames 320 and 322 captured using different subsets of SPAD pixels including respective sets of rows of active SPAD pixels. Similar to the partial image frames 310 and 312, the partial image frames may be combined via temporal filtering 324 to generate a composite image 326. Temporal filtering 324 may similarly utilize motion data 328 to align the image data of the partial image frames 320 and 322 to generate the composite image 326 (e.g., where the partial image frames 320 and 322 are captured from at least partially different poses or capture perspectives).

Figure 4A:
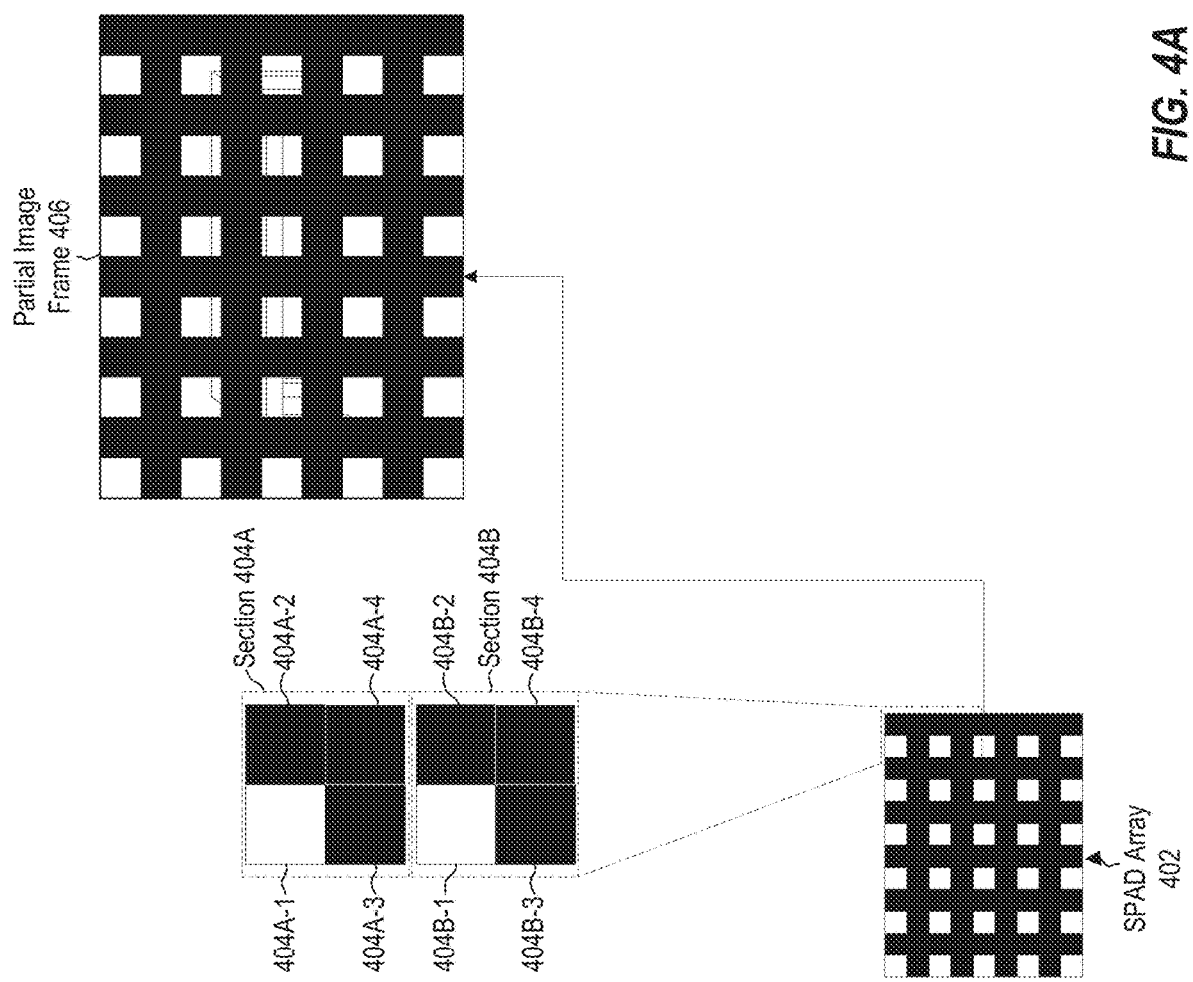

FIGS. 4A-4E illustrate an additional example of these principles of capturing consecutive partial image frames using different subsets of SPAD pixels of a SPAD array in a sampling mode to generate a composite image. In particular, FIG. 4A illustrates a SPAD array 402 (which may generally correspond to the other SPAD arrays described herein) and illustrates a first subset of SPAD pixels used to capture a first partial image frame 406. For example, the SPAD array 402 may be divided into sections that each comprise 2×2 SPAD pixels (e.g., sections 404A, 404B, and so forth). The first subset of SPAD pixels used to capture the first partial image frame 406 may comprise a respective first SPAD pixel from each different section of SPAD pixels (e.g., SPAD pixel 404A-1 from section 404A, SPAD pixel 404B-1 from section 404B, and so forth). As before, the partial image frame 406 is conceptually depicted with placeholder pixels to indicate that the portions of the environment not captured by the first subset of SPAD pixels at the desired resolution may be obtained by other subsets of SPAD pixels in subsequent partial image frames.

Figure 4B:
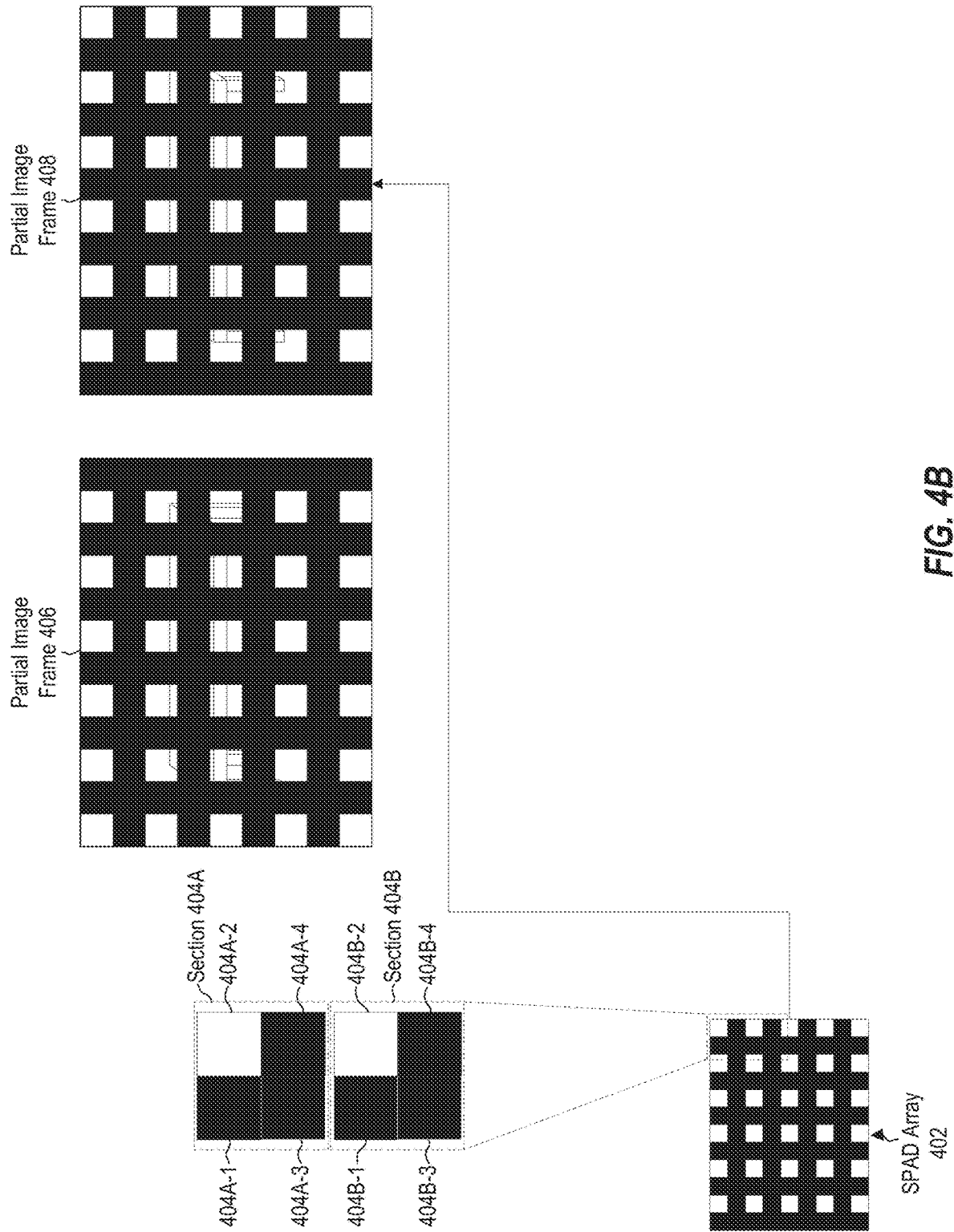
Figure 4C:
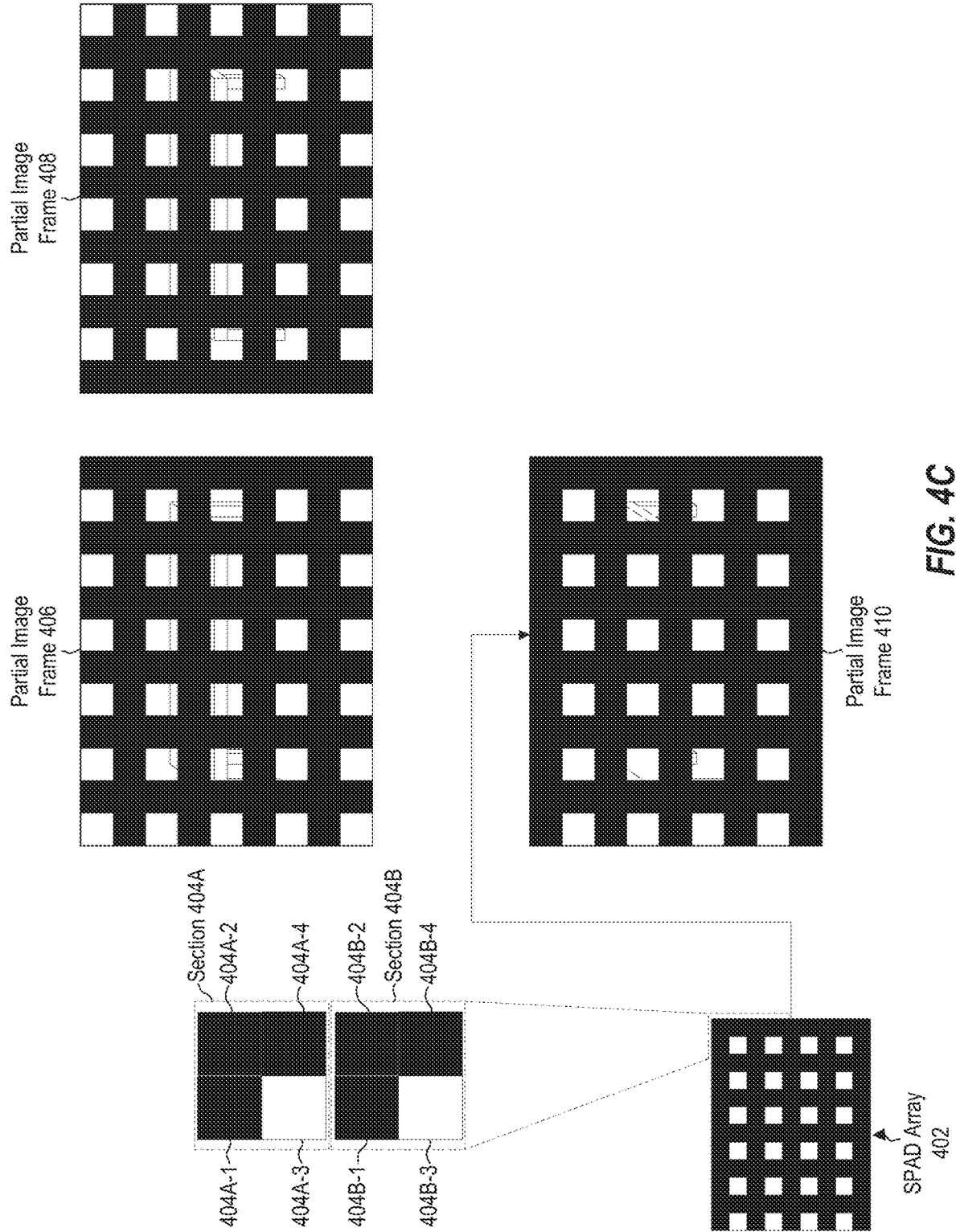

Similarly, FIG. 4B illustrates the SPAD array 402 and a second subset of SPAD pixels used to capture a second partial image frame 408. As depicted in FIG. 4B, the second subset of SPAD pixels used to capture the second partial image frame 408 frame may comprise a respective second SPAD pixel from each different section of SPAD pixels (e.g., SPAD pixel 404A-2 from section 404A, SPAD pixel 404B-2 from section 404B, and so forth). Furthermore, FIG. 4C illustrates the SPAD array 402 and a third subset of SPAD pixels used to capture a third partial image frame 410. As depicted in FIG. 4C, the third subset of SPAD pixels used to capture the third partial image frame 410 may comprise a respective third SPAD pixel from each different section of SPAD pixels (e.g., SPAD pixel 404A-3 from section 404A, SPAD pixel 404B-3 from section 404B, and so forth). Still furthermore, FIG. 4D illustrates the SPAD array 402 and a fourth subset of SPAD pixels used to capture a fourth partial image frame 412. As depicted in FIG. 4D, the fourth subset of SPAD pixels used to capture the fourth partial image frame 412 may comprise a respective fourth SPAD pixel from each different section of SPAD pixels (e.g., SPAD pixel 404A-4 from section 404A, SPAD pixel 404B-4 from section 404B, and so forth).

The different partial image frames 406, 408, 410, and 412 of FIGS. 4A-4D are captured in temporal sequence (e.g., each partial image frame is associated with a respective timepoint), and the different partial image frames 406, 408, 410, and 412 may have at least partially different poses associated therewith.

Figure 4E:
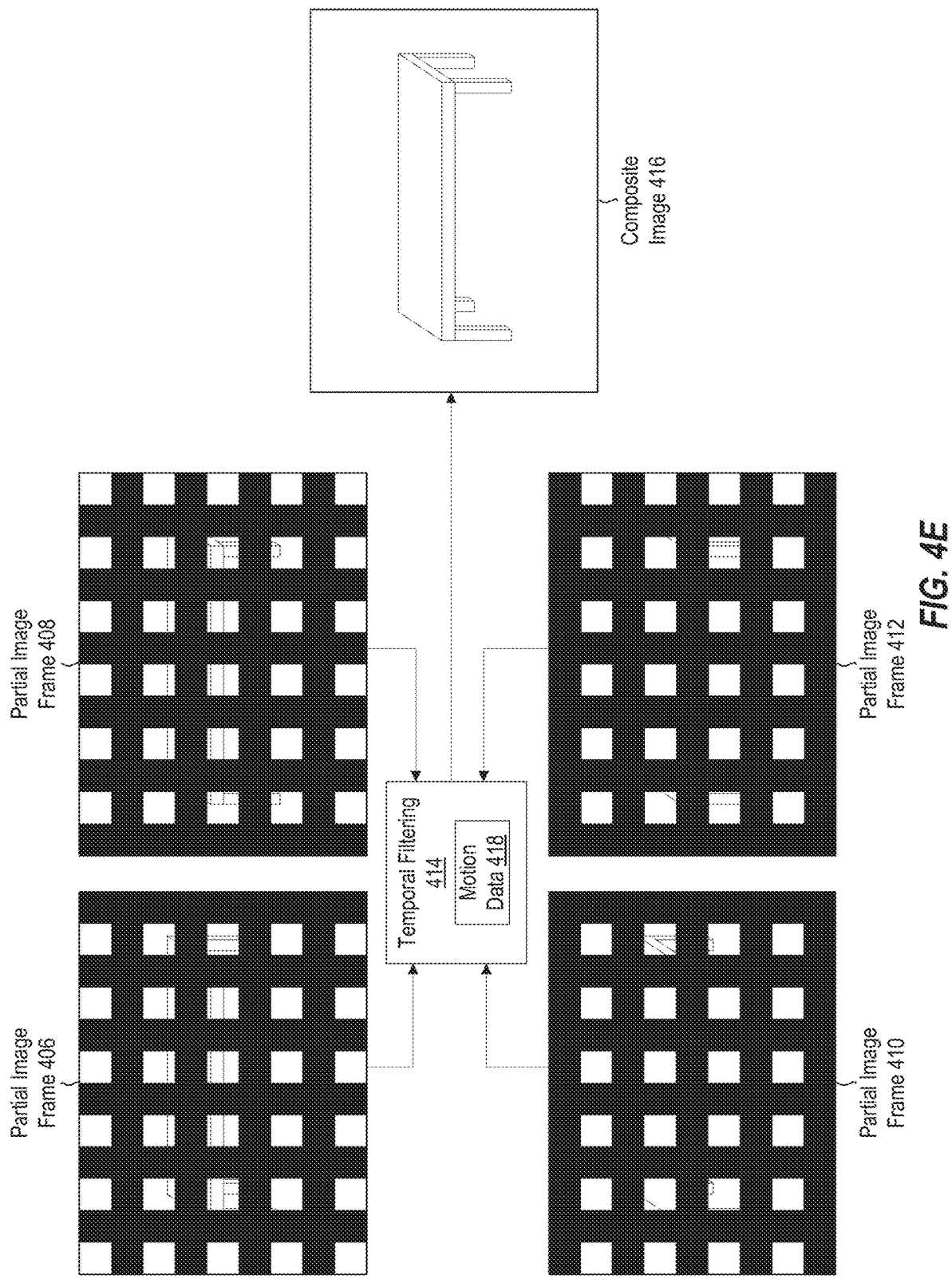
FIG. 4E illustrates an additional example of temporally filtering consecutively captured partial image frames to generate composite images.

FIG. 4E illustrates the different partial image frames 406, 408, 410, and 412 of FIGS. 4A-4D being composited via temporal filtering 414 to generate a composite image 416 (utilizing motion data 418 as needed). As depicted in FIG. 4E, the composite image comprises an image resolution that corresponds to the image resolution of the image frame 210 captured under a normal image acquisition mode (see FIG. 2A). Thus, utilizing techniques of the present disclosure, full-resolution SPAD imagery may be acquired while operating a SPAD sensor at 25% power (or at another partial power level).

In some instances, the quantity or ratio of active SPAD pixels used in each separate subset of SPAD pixels for capturing consecutive partial image frames in a sampling mode is dynamically determined based on the runtime conditions measurement(s) 216. For instance, multiple thresholds may be used to trigger different configurations of active SPAD pixels for subsets of SPAD pixels of a sampling mode. By way of example, a runtime light 218 of about 300 lux may trigger a sampling mode where 50% of the SPAD pixels are activated for each subset of SPAD pixels to facilitate image acquisition (e.g., as shown by example in FIGS. 3A-3D), and a runtime light 218 of about 1000 lux may trigger a sampling mode where 25% of the SPAD pixels are activated for each subset of SPAD pixels to facilitate image acquisition (e.g., as shown by example in FIGS. 4A-4E). Other quantities and/or ratios for other light levels and/or runtime temperatures may be used. In this regard, a quantity of temporally consecutive partial image frames used to generate each composite image may be modified based on the runtime conditions measurement(s) 216 (e.g., two partial image frames may be used where 50% of SPAD pixels are activated for each subset of SPAD pixels, four partial image frames may be used where 25% of SPAD pixels are activated for each subset of SPAD pixels, three partial image frames may be used where one third of SPAD pixels are activated for each subset of SPAD pixels, and so forth).

Figure 5:
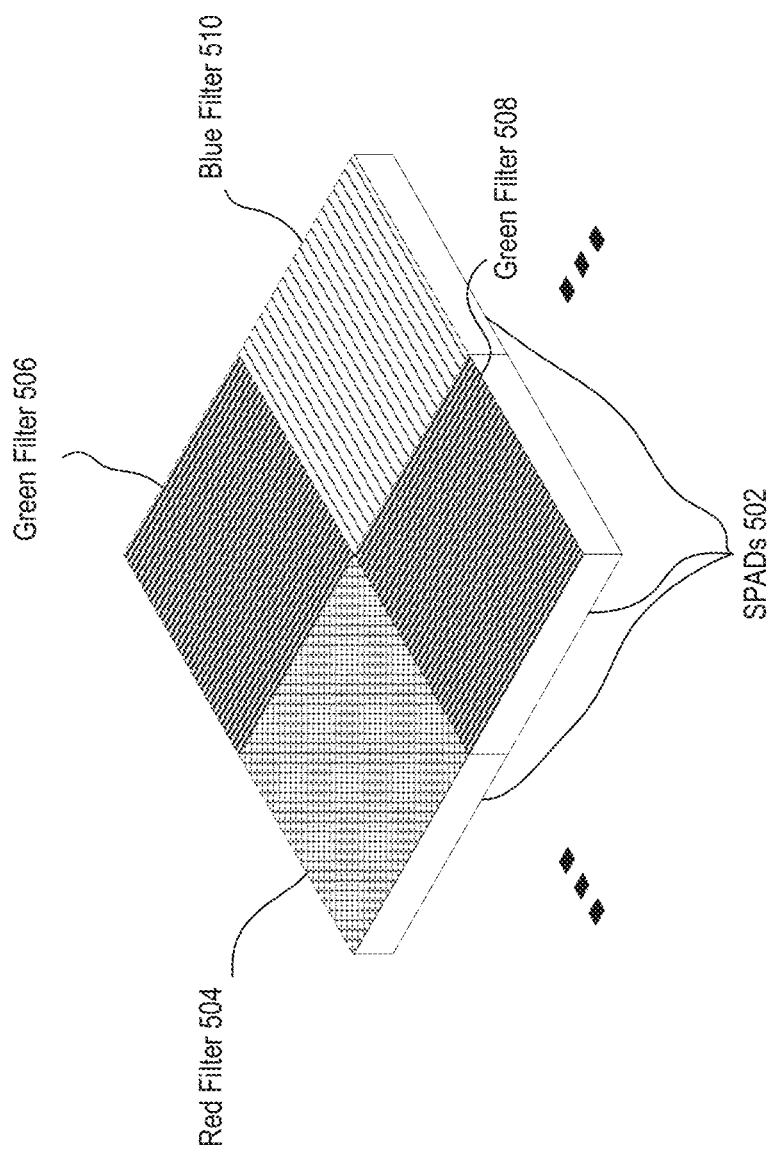
FIG. 5 illustrates example SPAD pixels of a SPAD array that include color filters.

As noted herein, the principles described herein may additionally or alternatively be implemented utilizing any type of image sensor (e.g., SPAD, CMOS, CCD and/or other image sensors). Furthermore, the principles described herein may additionally or alternatively be implemented utilizing image sensors that include color filters. FIG. 5 illustrates an example section of SPAD pixels 502 of a SPAD array (e.g., SPAD array 112, or any other SPAD array described herein) that includes respective color filters positioned over the SPAD pixels 502 thereof. FIG. 5 illustrates the color filters positioned over the SPADs 502 in a Bayer pattern, in particular with diagonally disposed green filters 506 and 508 and with a diagonally disposed red filter 504 and blue filter 510. This pattern may be repeated over a SPAD array to form a mosaic of color filtered SPAD pixels (as indicated by the ellipses). Although at least some of the examples disclosed herein focus, in at least some respects, on color-filtered SPADs 502 of a SPAD array arranged in a Bayer pattern, other patterns are within the scope of the present disclosure, such as by way of non-limiting example, CYGM (cyan, yellow, green magenta), RGBE (red, green, blue, emerald), Foveon X3 (e.g., a vertically arranged red, green, blue pattern), panchromatic cell patterns (e.g., RGBW (red, green, blue, white), CMYW (cyan, magenta, yellow, white), Fujifilm EXR, Fujifilm X-Trans, Quad Bayer)), and/or others. Furthermore, combinations of filtered and non-filtered SPADs (or other image sensing pixels) are within the scope of the present disclosure (e.g., arrangements of unfiltered SPADs and infrared filtered SPADs, arrangements of visible light filtered SPADs and infrared filtered SPADs, etc.).

Figure 6A:
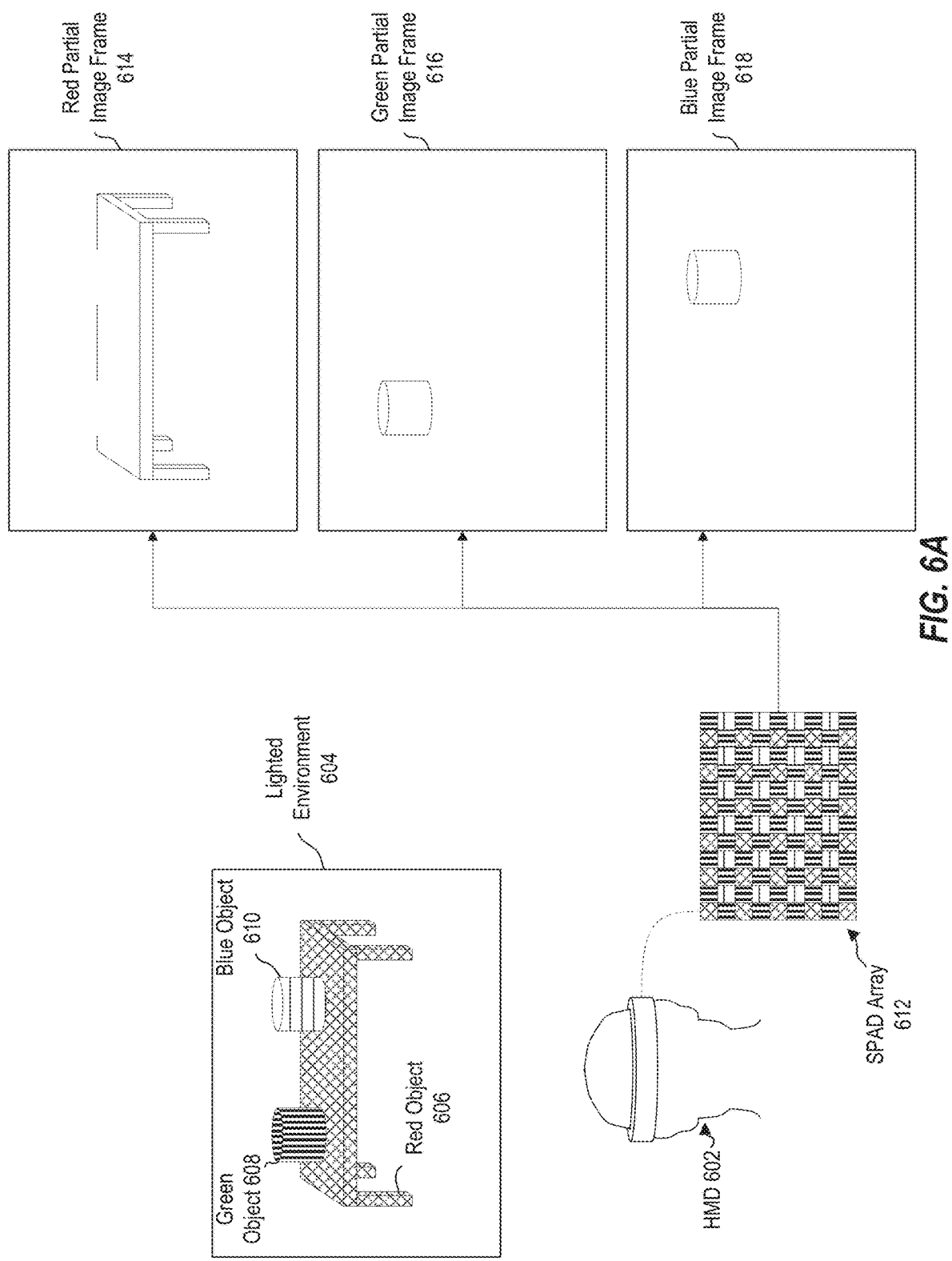
FIG. 6A illustrates an example of capturing consecutive partial image frames using subsets of SPAD pixels associated with different color channels.

FIG. 6A illustrates that the subsets of SPAD pixels used to acquire partial image frames for generating composite image frames may coincide with the colors of the different color filters positioned over the SPAD pixels. For example, FIG. 6A illustrates an example HMD 602 capturing a lighted environment 604 that includes a red object 606, a green object 608, and a blue object 610. The HMD 602 includes a SPAD array 612 to facilitate the capturing, and the SPAD array 612 includes SPAD pixels in a Bayer pattern as shown in FIG. 5.

In the example shown in FIG. 6A, the first subset of SPAD pixels of the SPAD array 612 used to acquire the red partial image frame 614 includes the SPAD pixels of the SPAD array that include a red color filter (e.g., red filter 504) positioned thereover. For example, for each 2×2 section of SPAD pixels of the SPAD array 612 that includes a red color filter 504, green filters 506 and 508, and blue filter 510, the first subset of SPAD pixels may comprise the SPAD pixel from each section that includes a red color filter 504. Accordingly, the red partial image frame 614 includes image data depicting the red object 606 based on photons reflected or scattered by the red object 606 toward the SPAD array 612 and that transmit through the red color filters to be detected by the first subset of SPAD pixels (placeholder pixels are not shown in the partial image frames of FIG. 6A for simplicity).

Furthermore, in FIG. 6A, the second subset of SPAD pixels of the SPAD array 612 used to acquire the green partial image frame 616 includes the SPAD pixels of the SPAD array that include a green color filter (e.g., green filters 506, 508) positioned thereover. Accordingly, the green partial image frame 616 includes image data depicting the green object 608 based on photons reflected or scattered by the green object 608 toward the SPAD array 612 and that transmit through the green color filters to be detected by the second subset of SPAD pixels. Similarly, the third subset of SPAD pixels of the SPAD array 612 used to acquire the blue partial image frame 618 includes the SPAD pixels of the SPAD array that include a blue color filter (e.g., blue filter 510) positioned thereover. Accordingly, the blue partial image frame 618 includes image data depicting the blue object 610 based on photons reflected or scattered by the blue object 610 toward the SPAD array 612 and that transmit through the blue color filters to be detected by the third subset of SPAD pixels. The color-specific partial image frames 614, 616, and 618 may be captured in (any) temporal sequence.

Figure 6B:
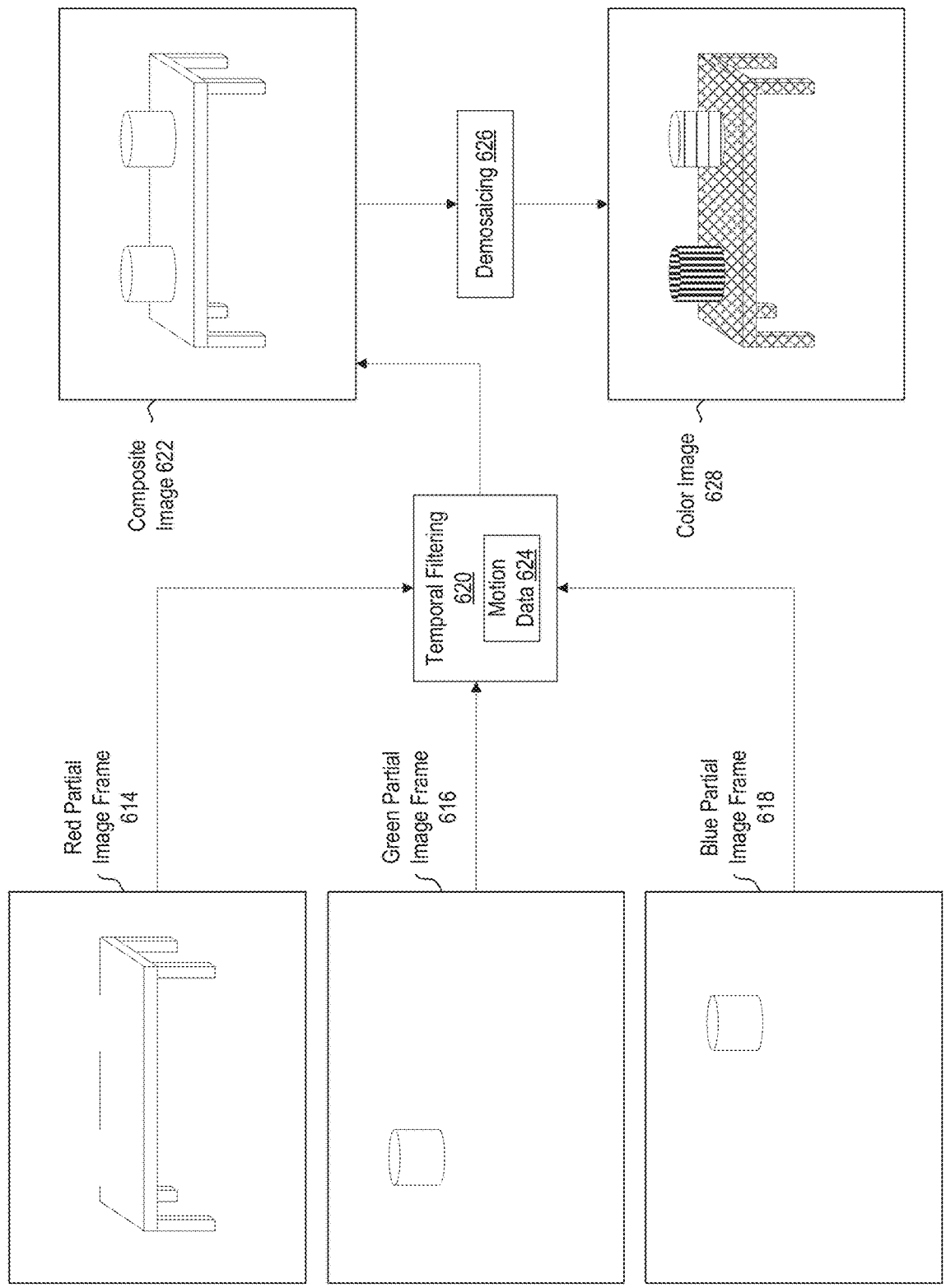
FIG. 6B illustrates an example of generating a composite image by temporally filtering consecutively captured partial image frames and generating a color image by demosaicing the composite image.

FIG. 6B illustrates the different color-specific partial image frames 614, 616, and 618 of FIG. 6A being composited via temporal filtering 620 to generate a composite image 622 (utilizing motion data 624 as needed). The composite image 622 combines the intensity data from the red partial image frame 614, the green partial image frame 616, and the blue partial image frame into a single image. FIG. 6B further illustrates performing demosaicing 626 on the composite image 622 to generate a color image 628. Demosaicing may comprise interpolating or extrapolating a color value (e.g., an RGB value) for each image pixel (or SPAD pixel) of an image frame (or a SPAD array that captures an image frame). In contrast with generating a single color value for each block of Bayer pixels (e.g., each 2×2 set of RGB pixels) to generate a color image (thereby causing an image resolution loss), demosaicing may provide RGB color imagery without loss of image resolution. Accordingly, techniques of the present disclosure may facilitate low power acquisition of color imagery.

The specific quantities, ratios, and/or arrangements of SPAD pixels discussed in the examples above (e.g., quantity of SPAD pixels in a section of SPAD pixels, subset of SPAD pixels, etc.) are provided by way of example only and are not limiting of the present disclosure.

Example Method(s) for Power Efficient Image Acquisition Using SPADs

The following discussion now refers to a number of methods and method acts that may be performed by the disclosed systems. Although the method acts are discussed in a certain order and illustrated in a flow chart as occurring in a particular order, no particular ordering is required unless specifically stated, or required because an act is dependent on another act being completed prior to the act being performed. One will appreciate that certain embodiments of the present disclosure may omit one or more of the acts described herein.

Figure 7:
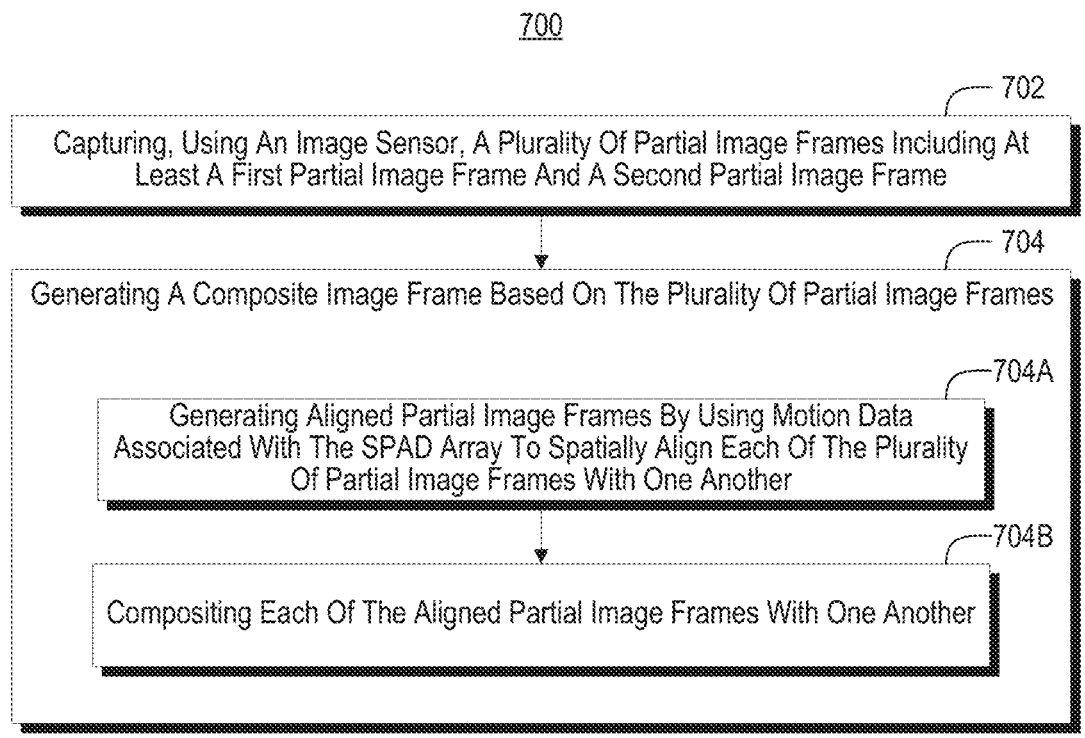
FIGS. 7 and 8 illustrate example flow diagrams depicting acts associated with power efficient image acquisition using SPADs.
Figure 8:
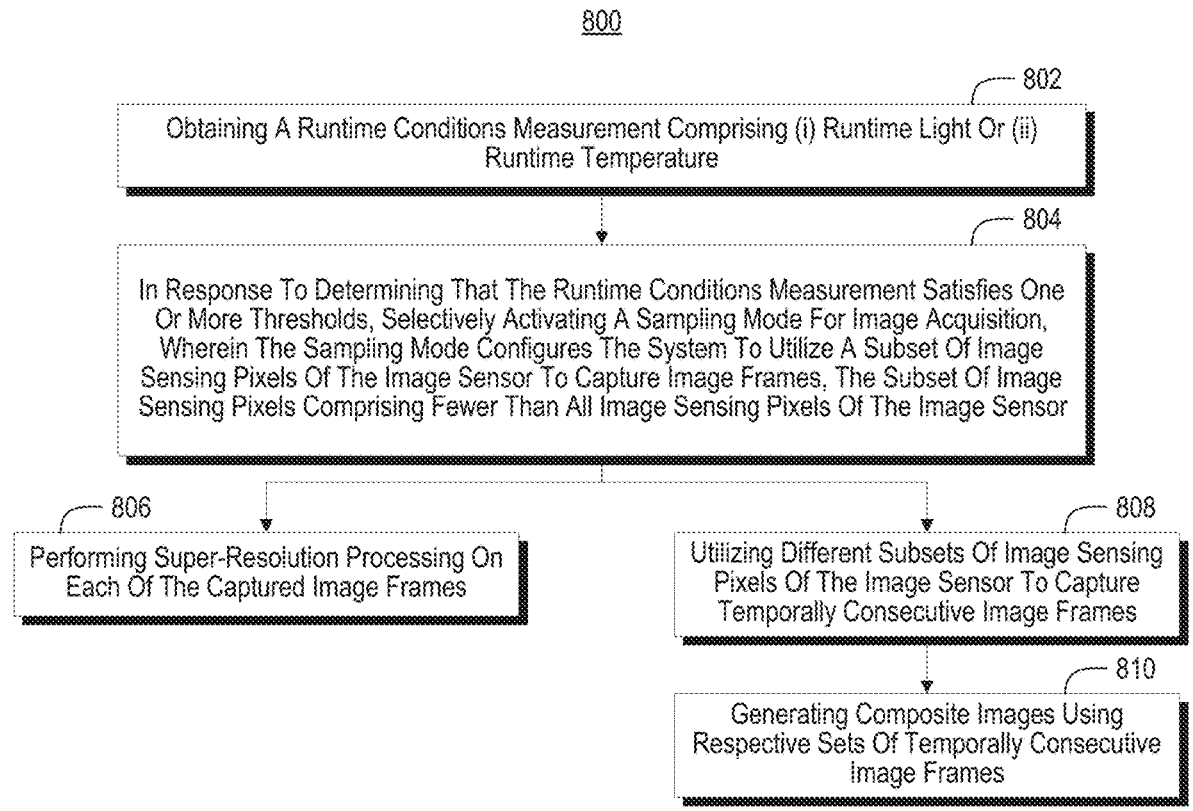

FIGS. 7 and 8 illustrate example flow diagrams 700 and 800, respectively, depicting acts associated with power efficient image acquisition using SPADs. The discussion of the various acts represented in the flow diagrams include references to various hardware components described in more detail with reference to FIG. 1.

Act 702 of flow diagram 700 of FIG. 7 includes capturing, using an image sensor, a plurality of partial image frames including at least a first partial image frame and a second partial image frame. Act 702 is performed, in some instances, by a system utilizing processor(s) 102, storage 104, sensor(s) 110 (e.g., SPAD array 112), input/output system(s) 116, communication system(s) 118, and/or other components.

In some implementations, the first partial image frame is captured at a first timepoint using a first subset of image sensing pixels of the plurality of image sensing pixels of the image sensor, and the second partial image frame is captured at a second timepoint using a second subset of image sensing pixels of the plurality of image sensing pixels of the image sensor. The second subset of image sensing pixels includes different image sensing pixels than the first subset of image sensing pixels, and the second timepoint is temporally subsequent to the first timepoint.

Furthermore, in some instances, the image sensor includes a single photon avalanche diode (SPAD) array, such that the plurality of image sensing pixels includes a plurality of SPAD pixels, the first subset of image sensing pixels includes a first subset of SPAD pixels of the plurality of SPAD pixels, and the second subset of image sensing pixels includes a second subset of SPAD pixels of the plurality of SPAD pixels.

In some implementations, the plurality of SPAD pixels comprises a plurality of sections of SPAD pixels, the first subset of SPAD pixels comprises at least one SPAD pixel from each of the plurality of sections of SPAD pixels, and the second subset of SPAD pixels comprises at least one different SPAD pixel from each of the plurality of sections of SPAD pixels.

In some implementations, each of the plurality of sections of SPAD pixels includes a respective first SPAD pixel and a respective second SPAD pixel, the first subset of SPAD pixels includes the respective first SPAD pixel of each of the plurality of sections of SPAD pixels, and the second subset of SPAD pixels includes the respective second SPAD pixel of each of the plurality of sections of SPAD pixels.

In some implementations, the plurality of partial image frames further includes, in addition to first and second partial image frames, a third partial image frame and a fourth partial image frame. The third partial image frame is captured at a third timepoint using a third subset of SPAD pixels of the plurality of SPAD pixels of the SPAD array. The third timepoint is temporally subsequent to the second timepoint. The third subset of SPAD pixels includes different SPAD pixels than the first subset of SPAD pixels and the second subset of SPAD pixels. The fourth partial image frame is captured at a fourth timepoint using a fourth subset of SPAD pixels of the plurality of SPAD pixels of the SPAD array. The fourth timepoint is temporally subsequent to the third timepoint. The fourth subset of SPAD pixels includes different SPAD pixels than the first subset of SPAD pixels and the second subset of SPAD pixels and the third subset of SPAD pixels.

In some implementations, each of the plurality of sections of SPAD pixels includes a respective first SPAD pixel, a respective second SPAD pixel, a respective third SPAD pixel, and a respective fourth SPAD pixel. Furthermore, in some instances, the first subset of SPAD pixels comprises the respective first SPAD pixel of each of the plurality of sections of SPAD pixels, the second subset of SPAD pixels comprises the respective second SPAD pixel of each of the plurality of sections of SPAD pixels, the third subset of SPAD pixels comprises the respective third SPAD pixel of each of the plurality of sections of SPAD pixels, and the fourth subset of SPAD pixels comprises the respective fourth SPAD pixel of each of the plurality of sections of SPAD pixels.

In some implementations, each of the plurality of SPAD pixels comprises a respective color filter positioned thereover. Each of the plurality of sections of SPAD pixels includes at least one respective first SPAD pixel associated with a first color, at least one respective second SPAD pixel associated with a second color, and at least one respective third SPAD pixel associated with a third color. The plurality of partial image frames further comprises, in addition to a first and second partial image frame, a third partial image frame. The third partial image frame is captured at a third timepoint using a third subset of SPAD pixels of the plurality of SPAD pixels of the SPAD array. The third timepoint is temporally subsequent to the second timepoint, and the third subset of SPAD pixels includes different SPAD pixels than the first subset of SPAD pixels and the second subset of SPAD pixels. The first subset of SPAD pixels comprises the at least one respective first SPAD pixel of each of the plurality of sections of SPAD pixels associated with the first color, the second subset of SPAD pixels comprises the at least one respective second SPAD pixel of each of the plurality of sections of SPAD pixels associated with the second color, and the third subset of SPAD pixels comprises the at least one respective third SPAD pixel of each of the plurality of sections of SPAD pixels associated with the third color. In some implementations, the first color comprises red, the second color comprises green, and the third color comprises blue. Each of the plurality of sections of SPAD pixels may be arranged in a Bayer pattern.

In some implementations, the first subset of SPAD pixels comprises a first set of rows of SPAD pixels of the plurality of SPAD pixels, and the second subset of SPAD pixels comprises a second set of rows of SPAD pixels of the plurality of SPAD pixels. In some implementations, the first subset of SPAD pixels comprises a first set of columns of SPAD pixels of the plurality of SPAD pixels, and the second subset of SPAD pixels comprises a second set of columns of SPAD pixels of the plurality of SPAD pixels.

Act 704 of flow diagram 700 includes generating a composite image frame based on the plurality of partial image frames. Act 704 is performed, in some instances, by a system utilizing processor(s) 102, storage 104, sensor(s) 110, input/output system(s) 116, communication system(s) 118, and/or other components. In some implementations, act 704 includes various sub-acts that may be performed. For example, act 704A of flow diagram 700 includes generating aligned partial image frames by using motion data associated with the SPAD array to spatially align each of the plurality of partial image frames with one another. Furthermore, Act 704B of flow diagram 700 includes compositing each of the aligned partial image frames with one another.

In some instances, one or more of the acts of flow diagram 700 is/are performed in response to detecting activation of a power saving mode based on a runtime conditions measurement. Furthermore, in some instances, a quantity of partial image frames in the plurality of partial image frames is based on the runtime conditions measurement.

Act 802 of flow diagram 800 of FIG. 8 includes obtaining a runtime conditions measurement comprising (i) runtime light or (ii) runtime temperature. Act 802 is performed, in some instances, by a system utilizing processor(s) 102, storage 104, sensor(s) 110 (e.g., SPAD array(s) 112), input/output system(s) 116, communication system(s) 118, and/or other components. In some implementations, the runtime conditions measurement comprises runtime light. In other instances, the runtime conditions measurement comprises runtime temperature.

Act 804 of flow diagram 800 includes in response to determining that the runtime conditions measurement satisfies one or more thresholds, selectively activating a sampling mode for image acquisition, wherein the sampling mode configures the system to utilize a subset of image sensing pixels of the image sensor to capture image frames, the subset of image sensing pixels comprising fewer than all image sensing pixels of the image sensor. Act 804 is performed, in some instances, by a system utilizing processor(s) 102, storage 104, sensor(s) 110, input/output system(s) 116, communication system(s) 118, and/or other components.

As is evident from FIG. 8, different actions may be performed in response to act 804. For example, act 806 may be performed in response to act 804. Act 806 of flow diagram 800 includes performing super-resolution processing on each of the captured image frames. Act 806 is performed, in some instances, by a system utilizing processor(s) 102, storage 104, sensor(s) 110, input/output system(s) 116, communication system(s) 118, and/or other components. In some implementations, the output image frames comprise a higher image resolution than the captured image frames.

Furthermore, act 808 may be performed in response to act 804. Act 808 of flow diagram 800 includes utilizing different subsets of image sensing pixels of the image sensor to capture temporally consecutive image frames. Act 808 is performed, in some instances, by a system utilizing processor(s) 102, storage 104, sensor(s) 110, input/output system(s) 116, communication system(s) 118, and/or other components.

Act 810 of flow diagram 800 (stemming from act 808) includes generating composite images using respective sets of temporally consecutive image frames. Act 810 is performed, in some instances, by a system utilizing processor(s) 102, storage 104, sensor(s) 110, input/output system(s) 116, communication system(s) 118, and/or other components. In some implementations, a quantity of temporally consecutive image frames in each set of temporally consecutive image frames is based on the runtime conditions measurement.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are one or more "physical computer storage media" or "hardware storage device(s)." Computer-readable media that merely carry computer-executable instructions without storing the computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in hardware in the form of computer-executable instructions, data, or data structures and that can be accessed by a general-purpose or special-purpose computer.

A "network" is defined as one or more data links that enable the transport of electronic data between computer systems and/or modules and/or other electronic devices.

When information is transferred or provided over a network or another communications connection (either hardwired, wireless, or a combination of hardwired or wireless) to a computer, the computer properly views the connection as a transmission medium. Transmission media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Disclosed embodiments may comprise or utilize cloud computing. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAS, pagers, routers, switches, wearable devices, and the like. The invention may also be practiced in distributed system environments where multiple computer systems (e.g., local and remote systems), which are linked through a network (either by hardwired data links, wireless data links, or by a combination of hardwired and wireless data links), perform tasks. In a distributed system environment, program modules may be located in local and/or remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Application-specific Standard Products (ASSPs), System-on-a-chip systems (SOCs), Complex Programmable Logic Devices (CPLDs), central processing units (CPUs), graphics processing units (GPUs), and/or others.

As used herein, the terms "executable module," "executable component," "component," "module," or "engine" can refer to hardware processing units or to software objects, routines, or methods that may be executed on one or more computer systems. The different components, modules, engines, and services described herein may be implemented as objects or processors that execute on one or more computer systems (e.g., as separate threads).

One will also appreciate how any feature or operation disclosed herein may be combined with any one or combination of the other features and operations disclosed herein. Additionally, the content or feature in any one of the figures may be combined or used in connection with any content or feature used in any of the other figures. In this regard, the content disclosed in any one figure is not mutually exclusive and instead may be combinable with the content from any of the other figures.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for power efficient image acquisition, the method comprising:

capturing, using an image sensor comprising a plurality of image sensing pixels, a plurality of partial image frames including at least a first partial image frame and a second partial image frame, the first partial image frame being captured at a first timepoint using a first subset of image sensing pixels of the plurality of image sensing pixels of the image sensor, the second partial image frame being captured at a second timepoint using a second subset of image sensing pixels of the plurality of image sensing pixels of the image sensor, the second subset of image sensing pixels comprising different image sensing pixels than the first subset of image sensing pixels, the second timepoint being temporally subsequent to the first timepoint;

generating aligned partial image frames by using motion data associated with the image sensor to spatially align the first partial image frame captured using the first subset of image sensing pixels with the second partial image frame captured using the second subset of image sensing pixels; and generating a composite image frame by compositing each of the aligned partial image frames with one another.

2. The method of claim 1, wherein:

the image sensor comprises a single photon avalanche diode (SPAD) array, the plurality of image sensing pixels comprises a plurality of SPAD pixels, the first subset of image sensing pixels comprises a first subset of SPAD pixels of the plurality of SPAD pixels, and the second subset of image sensing pixels comprises a second subset of SPAD pixels of the plurality of SPAD pixels.

3. The method of claim 2, wherein:
the plurality of SPAD pixels comprises a plurality of sections of SPAD pixels,
the first subset of SPAD pixels comprises at least one SPAD pixel from each of the plurality of sections of SPAD pixels, and
the second subset of SPAD pixels comprises at least one different SPAD pixel from each of the plurality of sections of SPAD pixels.

4. The method of claim 3, wherein:
each of the plurality of sections of SPAD pixels comprises a respective first SPAD pixel and a respective second SPAD pixel,
the first subset of SPAD pixels comprises the respective first SPAD pixel of each of the plurality of sections of SPAD pixels, and
the second subset of SPAD pixels comprises the respective second SPAD pixel of each of the plurality of sections of SPAD pixels.

5. The method of claim 3, wherein the plurality of partial image frames further comprises a third partial image frame and a fourth partial image frame, the third partial image frame being captured at a third timepoint using a third subset of SPAD pixels of the plurality of SPAD pixels of the SPAD array, the third timepoint being temporally subsequent to the second timepoint, the third subset of SPAD pixels comprising different SPAD pixels than the first subset of SPAD pixels and the second subset of SPAD pixels, the fourth partial image frame being captured at a fourth timepoint using a fourth subset of SPAD pixels of the plurality of SPAD pixels of the SPAD array, the fourth timepoint being temporally subsequent to the third timepoint, the fourth subset of SPAD pixels comprising different SPAD pixels than the first subset of SPAD pixels and the second subset of SPAD pixels and the third subset of SPAD pixels.

6. The method of claim 5, wherein:
each of the plurality of sections of SPAD pixels comprises a respective first SPAD pixel, a respective second SPAD pixel, a respective third SPAD pixel, and a respective fourth SPAD pixel,
the first subset of SPAD pixels comprises the respective first SPAD pixel of each of the plurality of sections of SPAD pixels,
the second subset of SPAD pixels comprises the respective second SPAD pixel of each of the plurality of sections of SPAD pixels,
the third subset of SPAD pixels comprises the respective third SPAD pixel of each of the plurality of sections of SPAD pixels, and
the fourth subset of SPAD pixels comprises the respective fourth SPAD pixel of each of the plurality of sections of SPAD pixels.

7. The method of claim 3, wherein:
each of the plurality of SPAD pixels comprises a respective color filter positioned thereover,
each of the plurality of sections of SPAD pixels comprises at least one respective first SPAD pixel associated with a first color, at least one respective second SPAD pixel associated with a second color, and at least one respective third SPAD pixel associated with a third color,
the plurality of partial image frames further comprises a third partial image frame, the third partial image frame being captured at a third timepoint using a third subset of SPAD pixels of the plurality of SPAD pixels of the SPAD array, the third timepoint being temporally subsequent to the second timepoint, the third subset of SPAD pixels comprising different SPAD pixels than the first subset of SPAD pixels and the second subset of SPAD pixels,
the first subset of SPAD pixels comprises the at least one respective first SPAD pixel of each of the plurality of sections of SPAD pixels associated with the first color,
the second subset of SPAD pixels comprises the at least one respective second SPAD pixel of each of the plurality of sections of SPAD pixels associated with the second color, and
the third subset of SPAD pixels comprises the at least one respective third SPAD pixel of each of the plurality of sections of SPAD pixels associated with the third color.

8. The method of claim 7, wherein the first color comprises red, the second color comprises green, and the third color comprises blue, and wherein each of the plurality of sections of SPAD pixels is arranged in a Bayer pattern.

9. The method of claim 1, wherein the first subset of image sensing pixels and the second subset of image sensing pixels comprise non-overlapping subsets of image sensing pixels.

10. The method of claim 2, wherein:
the first subset of SPAD pixels comprises a first set of columns of SPAD pixels of the plurality of SPAD pixels and the second subset of SPAD pixels comprises a second set of columns of SPAD pixels of the plurality of SPAD pixels, or
the first subset of SPAD pixels comprises a first set of rows of SPAD pixels of the plurality of SPAD pixels and the second set of SPAD pixels comprises a second set of rows of SPAD pixels of the plurality of SPAD pixels.

11. The method of claim 1, further comprising:
capturing the plurality of partial image frames; and
generating the composite image frame in response to detecting activation of a power saving mode based on a runtime conditions measurement.

12. The method of claim 11, wherein a quantity of partial image frames in the plurality of partial image frames is based on the runtime conditions measurement.

13. A method for power efficient image acquisition, the method comprising:
obtaining a runtime conditions measurement; and
in response to the runtime conditions measurement, selectively activating a pixel subset image acquisition mode for image acquisition, wherein the pixel subset image acquisition mode configures a system to utilize a subset of image sensing pixels of a plurality of image sensing pixels arranged in a pixel array of an image sensor to capture image frames, the subset of image sensing pixels comprising fewer than all image sensing pixels of the plurality of image sensing pixels of the image sensor.

14. The method of claim 13, wherein the runtime conditions measurement comprises runtime light.

15. The method of claim 13, wherein the runtime conditions measurement comprises runtime temperature.

16. The method of claim 13, wherein the pixel subset image acquisition mode configures the system to generate output image frames by performing super-resolution processing on each of the captured image frames, wherein the output image frames comprise a higher image resolution than the captured image frames.

17. The method of claim 13, wherein the pixel subset image acquisition mode configures the system to:
- utilize different subsets of image sensing pixels of the pixel array of the image sensor to capture temporally consecutive image frames; and
- generate composite images using respective sets of temporally consecutive image frames.

18. The method of claim 17, wherein a quantity of temporally consecutive image frames in each set of temporally consecutive image frames is based on the runtime conditions measurement.

19. A method for power efficient image acquisition, the method comprising:
- capturing, using an image sensor comprising a plurality of image sensing pixels, an image frame using a subset of image sensing pixels of the plurality of image sensing pixels of the image sensor while refraining from utilizing remaining image sensing pixels of the plurality of image sensing pixels to capture the image frame; and
- generating an output image frame by performing super-resolution processing on the image frame, wherein the output image frame comprises a higher image resolution than the image frame, wherein the super-resolution processing refrains from utilizing (i) image data captured by the remaining image sensing pixels of the plurality of image sensing pixels and (ii) image data captured by a second image sensor.

20. The method of claim 19, wherein:
- the image sensor comprises a single photon avalanche diode (SPAD) array.

\* \* \* \* \*